United States Patent
Hakeem et al.

(10) Patent No.: US 10,746,153 B2
(45) Date of Patent: Aug. 18, 2020

(54) METHOD AND SYSTEM FOR ADJUSTING ENGINE KNOCK BACKGROUND NOISE OF A VARIABLE DISPLACEMENT ENGINE

(71) Applicant: Ford Global Technologies, LLC, Dearborn, MI (US)

(72) Inventors: Mohannad Hakeem, Dearborn, MI (US); James Matthew Kindree, South Lyon, MI (US); Christopher Paul Glugla, Macomb, MI (US); Lee B. McQuinn, Lenox, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 121 days.

(21) Appl. No.: 15/985,337

(22) Filed: May 21, 2018

(65) Prior Publication Data

US 2019/0353132 A1    Nov. 21, 2019

(51) Int. Cl.
| | |
|---|---|
| *F02D 13/06* | (2006.01) |
| *F02P 5/152* | (2006.01) |
| *F02D 35/02* | (2006.01) |
| *F02D 41/00* | (2006.01) |
| *F02D 17/02* | (2006.01) |
| *F02P 9/00* | (2006.01) |
| *F01L 13/00* | (2006.01) |

(Continued)

(52) U.S. Cl.
CPC ......... *F02P 5/1521* (2013.01); *F01L 13/0005* (2013.01); *F02D 13/06* (2013.01); *F02D 17/02* (2013.01); *F02D 35/027* (2013.01); *F02D 41/0087* (2013.01); *F02D 41/401* (2013.01); *F02P 5/045* (2013.01); *F02P 9/002* (2013.01); *F01L 2013/001* (2013.01); *F02D 2041/0012* (2013.01); *F02D 2200/101* (2013.01)

(58) Field of Classification Search
None
See application file for complete search history.

(56) References Cited

U.S. PATENT DOCUMENTS

| | | |
|---|---|---|
| 6,763,297 B1 | 7/2004 | Stahl et al. |
| 7,007,663 B2 | 3/2006 | Mashiki |
| 7,104,244 B2 | 9/2006 | Nishi et al. |

(Continued)

FOREIGN PATENT DOCUMENTS

| | | |
|---|---|---|
| DE | 102012204086 A1 | 9/2013 |
| WO | 2009020016 A1 | 2/2009 |

OTHER PUBLICATIONS

Hakeem, M. et al., "Method and System for Variable Displacement Engine Knock Control," U.S. Appl. No. 15/985,257, filed May 21, 2018, 77 pages.

(Continued)

*Primary Examiner* — Kevin R Steckbauer
(74) *Attorney, Agent, or Firm* — Geoffrey Brumbaugh; McCoy Russell LLP

(57) ABSTRACT

Methods and systems are provided for operating a variable displacement engine that includes a knock control system. Fuel injection timing and cylinder firing patterns may be adjusted to maintain engine background noise levels so that the presence or absence of engine knock may be more reliably detected. Further, select variable engine displacement modes may be avoided so that engine background noise level changes may be reduced to improve engine knock detection.

18 Claims, 14 Drawing Sheets

(51) Int. Cl.
*F02D 41/40* (2006.01)
*F02P 5/04* (2006.01)

(56) References Cited

U.S. PATENT DOCUMENTS

| | | | |
|---|---|---|---|
| 7,194,993 B2 | 3/2007 | Lewis et al. | |
| 7,377,255 B2 | 5/2008 | Miyashita | |
| 7,387,018 B2 | 6/2008 | Wiles | |
| 7,765,054 B2* | 7/2010 | Jung | F02D 41/0087 |
| | | | 123/339.1 |
| 8,096,286 B2* | 1/2012 | Asai | F02D 17/02 |
| | | | 123/198 F |
| 8,146,565 B2 | 4/2012 | Leone et al. | |
| 8,683,977 B2* | 4/2014 | Miyashita | F02D 41/0087 |
| | | | 123/445 |
| 9,151,216 B2 | 10/2015 | Banker et al. | |
| 9,441,556 B2 | 9/2016 | Hamama et al. | |
| 9,611,792 B2 | 4/2017 | Wooldridge et al. | |
| 9,631,572 B2 | 4/2017 | Glugla | |
| 9,664,128 B2 | 5/2017 | Wooldridge et al. | |
| 9,732,686 B2* | 8/2017 | Glugla | F02D 41/0055 |
| 9,777,658 B2* | 10/2017 | Nagashima | F02D 41/04 |
| 9,840,971 B2* | 12/2017 | Glugla | F02D 17/02 |
| 9,879,625 B2* | 1/2018 | Glugla | F02D 41/0055 |
| 10,323,588 B2* | 6/2019 | VanDerWege | F02D 41/1466 |
| 10,450,975 B2* | 10/2019 | Touchette | F02D 41/3058 |
| 10,458,354 B2* | 10/2019 | Horii | F02D 41/2438 |
| 10,507,834 B2* | 12/2019 | Glugla | B60W 30/18136 |
| 10,557,419 B2* | 2/2020 | Shirahashi | F02D 41/402 |
| 10,557,436 B2* | 2/2020 | Shirahashi | F02D 35/025 |
| 2004/0074471 A1* | 4/2004 | Watanabe | F02D 41/0007 |
| | | | 123/305 |
| 2005/0241369 A1* | 11/2005 | Inoue | G01L 23/225 |
| | | | 73/35.09 |
| 2006/0021422 A1 | 2/2006 | Demura et al. | |
| 2009/0048729 A1 | 2/2009 | Waters et al. | |
| 2009/0308367 A1 | 12/2009 | Glugla | |
| 2011/0023829 A1* | 2/2011 | Miyashita | F02D 41/0087 |
| | | | 123/445 |
| 2012/0296558 A1* | 11/2012 | Ono | G01L 23/226 |
| | | | 701/111 |
| 2014/0216396 A1 | 8/2014 | Yamashita et al. | |
| 2014/0350823 A1* | 11/2014 | Glugla | F02P 5/152 |
| | | | 701/104 |
| 2015/0051809 A1* | 2/2015 | Glugla | F02D 17/02 |
| | | | 701/103 |
| 2015/0051816 A1* | 2/2015 | Glugla | F02D 41/0055 |
| | | | 701/108 |
| 2016/0017824 A1* | 1/2016 | Touchette | F02D 41/406 |
| | | | 123/481 |
| 2016/0115878 A1* | 4/2016 | VanDerWege | F02D 41/1466 |
| | | | 123/333 |
| 2017/0298848 A1* | 10/2017 | Glugla | F02D 41/0055 |
| 2018/0017004 A1* | 1/2018 | Horii | F02D 41/402 |
| 2018/0334968 A1* | 11/2018 | Shirahashi | F02D 41/1454 |
| 2018/0334988 A1* | 11/2018 | Shirahashi | F02D 41/403 |
| 2019/0353131 A1* | 11/2019 | Hakeem | F01L 13/0005 |
| 2019/0353133 A1* | 11/2019 | Hakeem | F02P 5/1521 |
| 2019/0360420 A1* | 11/2019 | Hakeem | F02D 41/1498 |
| 2020/0011263 A1* | 1/2020 | Matsuo | F02D 41/405 |
| 2020/0011264 A1* | 1/2020 | Matsuo | F02B 23/0678 |
| 2020/0047763 A1* | 2/2020 | Glugla | F02D 13/04 |

OTHER PUBLICATIONS

Hakeem, M. et al., "Method and System for Adjusting Engine Knock Background Noise Levels," U.S. Appl. No. 15/985,428, filed May 21, 2018, 93 pages.

* cited by examiner

METHOD AND SYSTEM FOR ADJUSTING ENGINE KNOCK BACKGROUND NOISE OF A VARIABLE DISPLACEMENT ENGINE

FIELD

The present application relates to methods and systems for detecting and responding to knock of a variable displacement engine (VDE).

BACKGROUND/SUMMARY

An internal combustion engine may experience knock after ignition in one or more engine cylinders has been initiated by a spark and when end gases are ignited by elevated temperatures and pressures in the cylinders. The end gases are not ignited by flame kernels that are produced by the sparks in the cylinders. Engine knock occurs most often at higher engine loads when pressure in the engine's cylinders is high.

Engines may also be operated with a variable number of active or deactivated cylinders, also referred to as variable displacement engines (or VDE), so that engine fuel economy may be increased for a desired engine torque output while optionally maintaining an overall exhaust mixture air-fuel ratio about stoichiometry. In some examples, half of an engine's cylinders may be disabled during selected conditions, where the selected conditions can be defined by parameters such as an engine speed/load window, vehicle speed, etc. In still other examples, cylinders may be individually and selectively deactivated.

If an engine is operated with fewer than all of its cylinders being activated to provide a desired engine torque output, pressures in the active engine cylinders will be higher than pressure in engine cylinders if all engine cylinders had been activated to provide the same desired engine torque. Consequently, the engine may tend to experience knock at lower driver demand torques as compared to if the engine were always operated with all of its cylinders being active.

Engine knock may be controlled on a VDE by activating cylinders and/or retarding spark in active cylinders. However, engine knock is often identified by comparing a background engine noise (e.g., vibration) level against an engine noise level during a crankshaft interval where there is a higher propensity for engine knock. A background engine noise level may decrease when engine cylinders are deactivated and the background engine noise level may increase when deactivated engine cylinders are reactivated. The changing level of background noise may cause the engine knock control system to indicate engine knock when no engine knock is present and it may also cause the engine knock control system to not indicate engine knock when engine knock is present. Therefore, it would be desirable to provide a way of increasing the reliability of the engine knock control system when an engine transitions between VDE modes.

The inventors herein have recognized that engine knock detection may be compromised during VDE mode changes and have developed a method for operating an engine, comprising: operating a variable displacement engine; changing a start of injection (SOI) time from a first SOI time to a second SOI time based on maintaining fuel injector control actions for one or more engine cylinders that are performed during cylinder knock detection windows for engine cylinders when the variable displacement engine is operated with less than all of its cylinders activated.

By changing SOI timing when a new VDE mode is selected, it may be possible to provide the technical result of reducing false indications of engine knock that are due to engine knock background noise levels. In addition, by a cylinder firing pattern from a cylinder firing pattern that has been selected for activation, but has not been activated, to a cylinder firing pattern that maintains engine knock background noise levels of a presently activated cylinder mode, it may be possible to provide the technical result of detecting indications of engine knock right after an engine mode change.

In this way, it may be possible to reduce the possibility of engine degradation. Further, engine fuel economy may be improved when spark is not retarded due to false indications of engine knock. Additionally, other ways of reducing the possibility of false engine knock may be provided by adjusting fuel injection timing and cylinder firing order so that false engine knock indications may be avoided.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
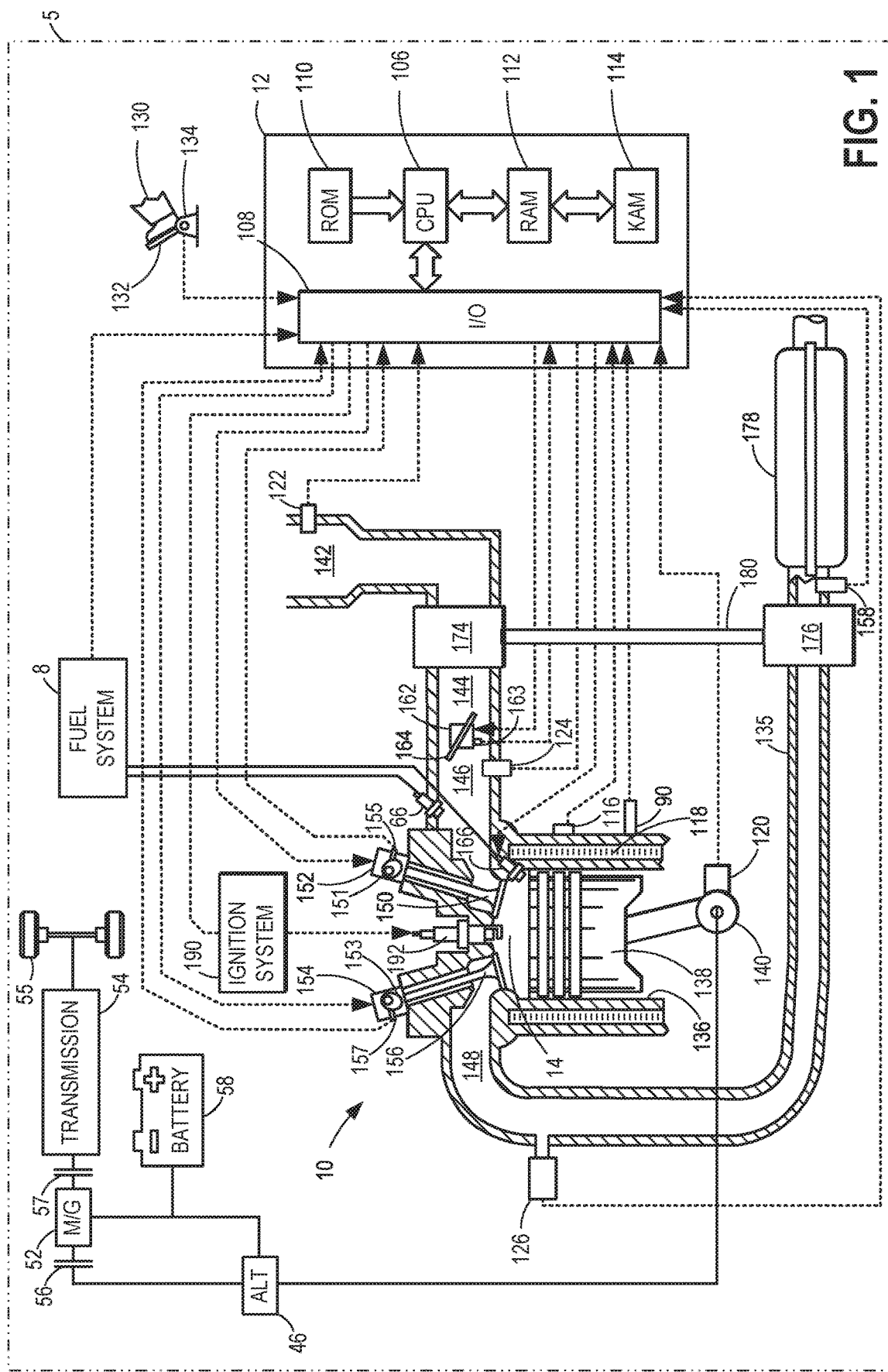
FIG. 1 shows a schematic depiction of an engine system of a vehicle.

The following description relates to systems and methods for operating a variable displacement engine (VDE) and controlling and detecting engine knock of the VDE engine. The engine may be of the type that is shown in FIG. 1. The engine may be operated according to the method of FIGS. 2-11. The method may adjust VDE mode and fuel injector timing to allow engine background noise levels to be continually assessed for some engine cylinders. Further, the method may maintain engine knock background noise levels at or near their present values even during a VDE mode changes. FIGS. 12-16 show example sequences where VDE mode and fuel injection timing are adjusted to provide more consistent engine background noise levels for some engine cylinders.

Turning now to the figures, FIG. 1 depicts an example of a cylinder 14 of an internal combustion engine 10, which may be included in a vehicle 5. Engine 10 may be a variable displacement engine (VDE), as described further below. Engine 10 may be controlled at least partially by a control system, including a controller 12, and by input from a human vehicle operator 130 via an input device 132. In this example, input device 132 includes an accelerator pedal and a pedal position sensor 134 for generating a proportional pedal position signal. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one vehicle wheel 55 of vehicle 5 via a transmission 54, as further described below. Further, a starter motor (not shown) may be coupled to crankshaft 140 via a flywheel to enable a starting operation of engine 10.

In some examples, vehicle 5 may be a hybrid vehicle with multiple sources of torque available to one or more vehicle wheels 55. In other examples, vehicle 5 is a conventional vehicle with only an engine or an electric vehicle with only an electric machine(s). In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 57 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission.

The powertrain may be configured in various manners, including as a parallel, a series, or a series-parallel hybrid vehicle. In electric vehicle examples, a system battery 58 may be a traction battery that delivers electrical power to electric machine 52 to provide torque to vehicle wheels 55. In some examples, electric machine 52 may also be operated as a generator to provide electrical power to charge system battery 58, for example, during a braking operation. It will be appreciated that in other examples, including non-electric vehicle examples, system battery 58 may be a typical starting, lighting, ignition (SLI) battery coupled to an alternator 46.

Alternator 46 may be configured to charge system battery 58 using engine torque via crankshaft 140 during engine running. In addition, alternator 46 may power one or more electrical systems of the engine, such as one or more auxiliary systems including a heating, ventilation, and air conditioning (HVAC) system, vehicle lights, an on-board entertainment system, and other auxiliary systems based on their corresponding electrical demands. In one example, a current drawn on the alternator may continually vary based on each of an operator cabin cooling demand, a battery charging requirement, other auxiliary vehicle system demands, and motor torque. A voltage regulator may be coupled to alternator 46 in order to regulate the power output of the alternator based upon system usage requirements, including auxiliary system demands.

Cylinder 14 of engine 10 can receive intake air via a series of intake passages 142 and 144 and an intake manifold 146. Intake manifold 146 can communicate with other cylinders of engine 10 in addition to cylinder 14. One or more of the intake passages may include one or more boosting devices, such as a turbocharger or a supercharger. For example, FIG. 1 shows engine 10 configured with a turbocharger, including a compressor 174 arranged between intake passages 142 and 144 and an exhaust turbine 176 arranged along an exhaust passage 135. Compressor 174 may be at least partially powered by exhaust turbine 176 via a shaft 180 when the boosting device is configured as a turbocharger. However, in other examples, such as when engine 10 is provided with a supercharger, compressor 174 may be powered by mechanical input from a motor or the engine and exhaust turbine 176 may be optionally omitted. In still other examples, engine 10 may be provided with an electric supercharger (e.g., an "eBooster"), and compressor 174 may be driven by an electric motor. In still other examples, engine 10 may not be provided with a boosting device, such as when engine 10 is a naturally aspirated engine.

A throttle 162 including a throttle plate 164 may be provided in the engine intake passages for varying a flow rate and/or pressure of intake air provided to the engine cylinders. For example, throttle 162 may be positioned downstream of compressor 174, as shown in FIG. 1, or may be alternatively provided upstream of compressor 174. A position of throttle 162 may be communicated to controller 12 via a signal from a throttle position sensor.

An exhaust manifold 148 can receive exhaust gases from other cylinders of engine 10 in addition to cylinder 14. An exhaust gas sensor 126 is shown coupled to exhaust manifold 148 upstream of an emission control device 178. Exhaust gas sensor 126 may be selected from among various suitable sensors for providing an indication of an exhaust gas air/fuel ratio (AFR), such as a linear oxygen sensor or UEGO (universal or wide-range exhaust gas oxygen), a two-state oxygen sensor or EGO, a HEGO (heated EGO), a NOx, a HC, or a CO sensor, for example. In the example of FIG. 1, exhaust gas sensor 126 is a UEGO sensor. Emission control device 178 may be a three-way catalyst, a NOx trap, various other emission control devices, or combinations thereof. In the example of FIG. 1, emission control device 178 is a three-way catalyst.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. In this example, intake valve 150 may be controlled by controller 12 by cam actuation via cam actuation system 152, including one or more cams 151. Similarly, exhaust valve 156 may be controlled by controller 12 via cam actuation system 154, including one or more cams 153. The position of intake valve 150 and exhaust valve 156 may be determined by valve position sensors (not shown) and/or camshaft position sensors 155 and 157, respectively.

During some conditions, controller 12 may vary the signals provided to cam actuation systems 152 and 154 to control the opening and closing of the respective intake and exhaust valves. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of variable displacement engine (VDE), cam profile switching (CPS), variable cam timing (VCT), variable valve timing (VVT), and/or variable valve lift (VVL) systems that may be operated by controller 12 to vary valve operation. In alternative examples, intake valve 150 and/or exhaust valve 156 may be controlled by electric valve actuation. For example, cylinder 14 may alternatively include an intake valve controlled via electric valve actuation and an exhaust valve controlled via cam actuation, including CPS and/or VCT systems. In other examples, the intake and exhaust valves may be controlled by a common valve actuator (or actuation system) or a variable valve timing actuator (or actuation system).

As further described herein, intake valve 150 and exhaust valve 156 may be deactivated during VDE mode via electrically actuated rocker arm mechanisms. In another example, intake valve 150 and exhaust valve 156 may be deactivated via a CPS mechanism in which a cam lobe with no lift is used for deactivated valves. Still other valve deactivation mechanisms may also be used, such as for electrically actuated valves. In one example, deactivation of intake valve 150 may be controlled by a first VDE actuator (e.g., a first electrically actuated rocker arm mechanism, coupled to intake valve 150) while deactivation of exhaust valve 156 may be controlled by a second VDE actuator (e.g., a second electrically actuated rocker arm mechanism, coupled to exhaust valve 156). In alternate examples, a single VDE actuator may control deactivation of both intake and exhaust valves of the cylinder. In still other examples, a single cylinder valve actuator deactivates a plurality of cylinders (both intake and exhaust valves), such as all of the cylinders in an engine bank, or a distinct actuator may control deactivation for all of the intake valves while another distinct actuator controls deactivation for all of the exhaust valves of the deactivated cylinders. It will be appreciated that if the cylinder is a non-deactivatable cylinder of the VDE engine, then the cylinder may not have any valve deactivating actuators. Each engine cylinder may include the valve control mechanisms described herein. Intake and exhaust valves are held in closed positions over one or more engine cycles when deactivated so as to prevent flow into or out of cylinder 14.

Cylinder 14 can have a compression ratio, which is a ratio of volumes when piston 138 is at bottom dead center (BDC) to top dead center (TDC). In one example, the compression ratio is in the range of 9:1 to 10:1. However, in some examples where different fuels are used, the compression ratio may be increased. This may happen, for example, when higher octane fuels or fuels with a higher latent enthalpy of vaporization are used. The compression ratio may also be increased if direct injection is used due to its effect on engine knock.

Each cylinder of engine 10 may include a spark plug 192 for initiating combustion. An ignition system 190 can provide an ignition spark to combustion chamber 14 via spark plug 192 in response to a spark advance signal from controller 12, under select operating modes. Spark timing may be adjusted based on engine operating conditions and driver torque demand. For example, spark may be provided at minimum spark advance for best torque (MBT) timing to maximize engine power and efficiency. Controller 12 may input engine operating conditions, including engine speed, engine load, and exhaust gas AFR, into a look-up table and output the corresponding MBT timing for the input engine operating conditions. In other examples, spark may be retarded from MBT, such as to expedite catalyst warm-up during engine start or to reduce an occurrence of engine knock.

In some examples, each cylinder of engine 10 may be configured with one or more fuel injectors for providing fuel thereto. As a non-limiting example, cylinder 14 is shown including a direct fuel injector 166 and a port fuel injector 66. Fuel injectors 166 and 66 may be configured to deliver fuel received from a fuel system 8. Fuel system 8 may include one or more fuel tanks, fuel pumps, and fuel rails. Fuel injector 166 is shown coupled directly to cylinder 14 for injecting fuel directly therein in proportion to a pulse width of a signal received from controller 12. Port fuel injector 66 may be controlled by controller 12 in a similar way. In this manner, fuel injector 166 provides what is known as direct injection (hereafter also referred to as "DI") of fuel into cylinder 14. While FIG. 1 shows fuel injector 166 positioned to one side of cylinder 14, fuel injector 166 may alternatively be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injectors 166 and 66 from a fuel tank of fuel system 8 via fuel pumps and fuel rails. Further, the fuel tank may have a pressure transducer providing a signal to controller 12.

Fuel injectors 166 and 66 may be configured to receive different fuels from fuel system 8 in varying relative amounts as a fuel mixture and further configured to inject this fuel mixture directly into cylinder. For example, fuel injector 166 may receive alcohol fuel and fuel injector 66 may receive gasoline. Further, fuel may be delivered to cylinder 14 during different strokes of a single cycle of the cylinder. For example, directly injected fuel may be delivered at least partially during a previous exhaust stroke, during an intake stroke, and/or during a compression stroke. Port injected fuel may be injected after intake valve closing of a previous cycle of the cylinder receiving fuel and up until intake valve closing of the present cylinder cycle. As such, for a single combustion event (e.g., combustion of fuel in the cylinder via spark ignition), one or multiple injections of fuel may be performed per cycle via either or both injectors. The multiple DI injections may be performed during the compression stroke, intake stroke, or any appropriate combination thereof in what is referred to as split fuel injection.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof, etc. One example of fuels with different heats of vaporization includes gasoline as a first fuel type with a lower heat of vaporization and ethanol as a second fuel type with a greater heat of vaporization. In another example, the engine may use gasoline as a first fuel type and an alcohol-containing fuel blend, such as E85 (which is approximately 85% ethanol and 15% gasoline) or M85 (which is approximately 85% methanol and 15% gasoline), as a second fuel type. Other feasible substances include water, methanol, a mixture of alcohol and water, a mixture of water and methanol, a mixture of alcohols, etc. In still another example, both fuels may be alcohol blends with varying alcohol compositions, wherein the first fuel type may be a gasoline alcohol blend with a lower concentration of alcohol, such as E10 (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities, such as a difference in temperature, viscosity, octane number, etc. Moreover, fuel characteristics of one or both fuel tanks may vary frequently, for example, due to day to day variations in tank refilling.

Controller 12 is shown in FIG. 1 as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including signals previously discussed and additionally including a measurement of inducted mass air flow (MAF) from a mass air flow sensor 122; an engine coolant temperature (ECT) from a temperature sensor 116 coupled to a cooling sleeve 118; an exhaust gas temperature from a temperature sensor 158 coupled to exhaust passage 135; a crankshaft position signal from a Hall effect sensor 120 (or other type) coupled to crankshaft 140; throttle position from a throttle position sensor 163; signal UEGO from exhaust gas sensor 126, which may be used by controller 12 to determine the air-fuel ratio of the exhaust gas; engine vibrations (e.g., knock) via knock sensor 90; and an absolute manifold pressure signal (MAP) from a MAP sensor 124. An engine speed signal, RPM, may be generated by controller 12 from crankshaft position. The manifold pressure signal MAP from MAP sensor 124 may be used to provide an indication of vacuum or pressure in the intake manifold. Controller 12 may infer an engine temperature based on the engine coolant temperature and infer a temperature of emission control device 178 based on the signal received from temperature sensor 158.

Controller 12 receives signals from the various sensors of FIG. 1 and employs the various actuators of FIG. 1 to adjust engine operation based on the received signals and instructions stored on a memory of the controller. For example, the controller may transition the engine to operating in VDE mode by actuating valve actuators 152 and 154 to deactivate selected cylinders, as further described with respect to FIG. 5.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

During selected conditions, such as when the full torque capability of engine 10 is not requested, one of a first or a second cylinder group may be selected for deactivation by controller 12 (herein also referred to as a VDE mode of operation). During the VDE mode, cylinders of the selected group of cylinders may be deactivated by shutting off respective fuel injectors 166 and 66. Further, valves 150 and 156 may be deactivated and held closed over one or more engine cycles. While fuel injectors of the disabled cylinders are turned off, the remaining enabled cylinders continue to carry out combustion, with corresponding fuel injectors and intake and exhaust valves active and operating. To meet torque requirements, the controller adjusts the amount of air entering active engine cylinders. Thus, to provide equivalent engine torque that an eight cylinder engine produces at 0.2 engine load and a particular engine speed, the active engine cylinders may operate at higher pressures than engine cylinders when the engine is operated with all engine cylinders being active. This requires higher manifold pressures, resulting in lowered pumping losses and increased engine efficiency. Additionally, the lower effective surface area (from only the active cylinders) exposed to combustion reduces engine heat losses, increasing the thermal efficiency of the engine.

Thus, the system of FIG. 1 provides for a system for operating an engine, comprising: a variable displacement engine; and a controller including executable instructions stored in non-transitory memory to operate the variable displacement engine and change a split ratio fuel injection when changing from operating the variable displacement engine with a first cylinder firing density to operating the variable displacement engine with a second cylinder firing density changes a total number of fuel injections that occur in a cylinder knock window. The system of includes where changing the split ratio fuel injection includes increasing a total number of fuel injections during a cycle of a cylinder. The system includes where changing the split ratio fuel injection includes decreasing a total number of fuel injections during a cycle of a cylinder. The system further comprises additional instructions for changing start of injection timing when changing from the first cylinder firing density to the second cylinder firing density. The system further comprises additional instructions for changing a cylinder firing pattern when changing from the first cylinder firing density to the second cylinder firing density.

Referring now to FIGS. 2-11, a method for operating a VDE engine is shown. The method of FIGS. 2-11 may be included in and may cooperate with the system of FIG. 1. At least portions of method 200 may be incorporated in the system of FIG. 1 as executable instructions stored in non-transitory memory. In addition, other portions of method 200 may be performed via a controller transforming operating states of devices and actuators in the physical world. The controller may employ engine actuators of the engine system to adjust engine operation. Further, method 200 may determine selected control parameters from sensor inputs.

At 202, method 200 determines vehicle and engine operating conditions via the sensors described in FIG. 1. Method 200 may determine operating conditions including but not limited to engine speed, engine load, engine temperature, ambient temperature, fuel injection timing, knock sensor output, fuel type, fuel octane, engine position, and engine air flow. Method 200 proceeds to 204.

At 204, method 200 judges if conditions are met for mapping the influence of fuel injector operation on engine knock background noise. In one example, conditions are met when engine speed is within a specified range (e.g., engine speed greater than a first threshold speed and less than a second threshold speed), when engine load is within a specified range (e.g., engine load greater than a first threshold load and less than a second threshold load), and engine temperature is greater than a threshold temperature. In other examples, method 200 may judge that conditions are met for mapping the influence of fuel injector operation on engine knock background noise when other vehicle operating conditions are met. If method 200 judges that conditions are met for mapping the influence of fuel injector operation on engine knock background noise, the answer is yes and method 200 proceeds to 250. Otherwise, the answer is no and method 200 proceeds to 206.

At 250, method 200 begins mapping the influence of fuel injector operation on engine knock background noise level. Method 200 maps engine knock background noise according to the method of FIG. 3. Alternatively, an observer of the type shown in FIG. 4 may be used to determine engine knock background noise. Method 200 proceeds to exit after mapping the engine knock background noise level.

At 206, method 200 judges if conditions are met to enter VDE modes. The specific VDE modes that the engine may operate within may be engine specific. For example, an inline four cylinder four stroke engine (I4) may include I4S (four cylinder combusting in a stationary pattern), I2S (two of the four cylinders combusting in each engine cycle in a stationary pattern (e.g., cylinders 1 and 3 combusting in a first engine cycle; cylinders 1 and 3 combusting in a second engine cycle)), and I2R (e.g., two of the four cylinders combusting in each engine cycle in a rolling pattern (e.g., cylinders 1 and 3 combusting in a first engine cycle; cylinders 2 and 4 combusting in a second engine cycle; cylinders 1 and 3 combusting in a third engine cycle). On the other hand, a V eight cylinder engine may combust in eight cylinder mode (V8S), in a V four stationary mode (V4S), in a V four rolling mode (V4R), in a V two stationary mode (V2S), and in a V two rolling mode (V2R), in a V six stationary mode (V6S), in a V six rolling mode (V6R).

Stationary VDE modes are modes where the same active cylinders (e.g., engine cylinders that are combusting fuel) are active for each engine cycle. Rolling VDE modes are modes where different active cylinders are active for two or more engine cycles. Further, the VDE operating modes may be described in terms of a cylinder density. For example, an eight cylinder engine may be operated in a 3-by-4 cylinder density where the engine fires (e.g., combusts fuel) three out of every four cylinder compression strokes. Similarly, when an engine is operated with a 2-by-4 cylinder density, the engine is fired in two out of every four cylinder compression strokes. Available VDE modes are modes that may be activated where cylinders are combusting fuel, and the available VDE modes may be made available or not available responsive to vehicle operating conditions. For example, if engine temperature is less than 10° C., then only V8 mode may be available. However, if engine temperature is greater than 30° C., then V4S, V6S, V4R, and V6R may be available.

VDE entry conditions where one or more VDE modes is available to be activated may include, but are not limited to engine temperature greater than a threshold temperature, driver demand torque greater than a threshold torque, engine speed greater than a threshold speed, and vehicle speed greater than a threshold speed. If method 200 judges that conditions are present to allow activation of VDE modes or to enter VDE, then the answer is yes and method 200 proceeds to 208. Otherwise, the answer is no and method 200 proceeds to 260.

At 208, method 200 selects a VDE mode including cylinder firing density and cylinder firing pattern based on vehicle operating conditions. However, if operating conditions do not indicate usefulness in selecting a new VDE mode including cylinder firing density and firing pattern, the previously selected VDE mode is maintained whether the VDE mode was selected at 208 or 212 during a previous engine cycle. Method 200 may select a VDE mode that includes a cylinder density and firing pattern from a plurality of unique VDE modes for the particular engine configuration (e.g., I4, V6, V8). In one example, method 200 selects VDE modes from the plurality of unique VDE modes that are available to enter responsive to vehicle operating conditions including but not limited to driver demand torque, engine speed, vehicle speed, active transmission gear, catalyst temperature, individual temperatures of the cylinders, engine noise and vibration limitations, and engine temperature. For example, method 200 may select the VDE mode that includes the fewest number of active cylinders that may meet the driver demand torque and engine noise and vibration limits for a particular engine speed and load. The selection may be performed via a state machine or logic. Method 200 proceeds to 210 after the unique VDE mode is selected.

In some examples, a base fuel injection mode may accompany the VDE mode that is selected at 208. For example, fuel may be injected to a cylinder via a single DI injection, PFI and DI injection, multiple DI injections, PFI and multiple DI injections. In one example, a base or default fuel injection mode may be retrieved from memory when the VDE mode is selected and the base fuel injection mode may be a function of engine speed and engine load as well as other control parameters.

At 210, method 200 judges if the VDE mode selected at 208 changes engine knock background noise levels as compared to VDE mode that is presently activated. For example, if the selected VDE mode commands a fuel injector off during an engine knock window for a cylinder in which the fuel injector was not commanded off during the presently activated VDE mode, then method 200 may judge that commanding the fuel injector off for the cylinder during the selected VDE mode changes the engine knock background noise level. Similarly, if the selected VDE mode commands a fuel injector on during an engine knock window for a cylinder in which the fuel injector was not commanded on during the presently activated VDE mode, then method 200 may judge that commanding the fuel injector on for the cylinder during the selected VDE mode changes the engine knock background noise level. If method 200 judges that the selected VDE mode from 208 changes the engine knock background noise levels as compared to engine background noise levels for the presently activated VDE mode, the answer is yes and method 200 proceeds to 212. Otherwise, the answer is no and method 200 proceeds to 270. Method 200 evaluates the engine knock background noise level for each knock window during the cylinder cycle.

The presence or absence of engine knock is evaluated during predetermined crankshaft intervals during each engine cycle for each cylinder that is combusting fuel. Thus, an eight cylinder engine includes eight knock windows each engine cycle (e.g., two revolutions) and a four cylinder engine includes four knock windows each engine cycle. In one example, the engine knock window for an engine cylinder may span a crankshaft interval from five crankshaft degrees after top-dead-center compression stroke to sixty crankshaft degrees after top-dead-center compression stroke. Of course, the crankshaft degree range for the engine knock window of the cylinder may be adjusted to other crankshaft angles.

At 270, method 200 maintains the VDE mode (e.g., cylinder firing density, cylinder firing pattern, and stationary or rolling strategy) that was selected at 208 or the VDE mode that was selected at 212. Further, method 200 activates the base or default fuel injection mode that was retrieved from memory at 208 or selected at 212. Method 200 also enters the cylinders that are active in a list stored in controller memory (RAM) so that the most recent activated VDE mode may be tracked. Method 200 proceeds to 214.

At 212, method 200 adjusts the cylinder density, firing pattern, and/or fuel injection mode from the VDE mode selected at 208 to reduce the possibility of changes to the engine knock background noise levels for each engine knock window during the cylinder cycle. The cylinder density, firing pattern, and/or fuel injection are adjusted according to the method of FIG. 7. Method 200 also enters the cylinders that are active in a list stored in controller memory (RAM) so that the most recent activated VDE mode may be tracked. Method 200 proceeds to 214 after adjusting the cylinder density, firing pattern, and/or fuel injection mode.

In addition, during conditions where a fuel injector control action takes place during a knock window of the present engine cycle, and then no control action for the fuel injector is scheduled to take place during the selected VDE mode, the engine knock background noise level for the particular cylinder knock window may be stored to controller memory so that it may be retrieved and used as the particular cylinder's knock background noise level when control actions for the fuel injector resume. For example, if all engine cylinders are active in the present engine cycle and the background knock noise level determined in the knock window of cylinder number three is 0.5 volts, then the fuel injector that turned off during the knock window of cylinder number three during the present engine cycle (e.g., the fuel injector for cylinder number six) is not turned off during the engine cycle when the selected VDE mode is activated because the fuel injector for cylinder number six is deactivated, the knock background noise level for cylinder number three when the fuel injector for cylinder number six is activated, may be stored in controller memory. If the fuel injector for cylinder number six is reactivated when all cylinders are reactivated, then the engine knock background noise level for cylinder number three may be adjusted to 0.5 volts. In this way, an engine knock background noise level may be reset to a previously determined value when the engine mode is switched back to a mode for which the engine knock background noise level is determined. Consequently, adjustments to the engine knock background noise levels for engine knock windows may be reduced so as to reduce the possibility of false knock indications.

At 214, method 200 deactivates direct and port fuel injectors of cylinders that are deactivated to provide and activate the VDE mode that is selected at 208 or 212. Further, method 200 deactivates engine intake and exhaust valves of cylinders in which combustion is not performed in the VDE mode that was selected at 208. By deactivating the direct and port fuel injectors, noise that may be transmitted to the engine and detected in knock windows of cylinders by closing the fuel injectors may be avoided so as to establish an engine background noise level that does not include noise and vibrations from deactivated fuel injectors. Method 200 also activates cylinders that are active in the selected VDE mode. Method 200 also enters the cylinders that are active in a list stored in controller memory (RAM) so that the most recent activated VDE mode may be tracked. Method 200 proceeds to 216.

At 216, method 200 determines whether or not the selected VDE mode was entered based on the engine knock background noise level. Method 200 determines if the selected VDE mode was entered according to the method of FIG. 6. Method 200 proceeds to 218.

At 218, method 200 assesses whether or not knock should be indicated for a particular cylinder based on the engine knock background noise levels. In one example, method 200 computes a knock intensity value for a particular cylinder by integrating and rectifying output of the knock sensor during the knock window of the particular cylinder and dividing the integrated and rectified knock sensor output by the engine knock background noise level (e.g., low pass filtered integrated and rectified knock sensor output) for the particular cylinder. Note that the integration of the knock sensor output for determining knock may occur during a different portion of the knock window than the integration of the output of the knock sensor during the knock window for determining integrated engine knock background noise level. If the knock intensity value exceeds a threshold value (e.g., 1 volt), then knock is indicated for the particular cylinder and spark timing for the particular cylinder is retarded by a predetermined amount. The spark is retarded for the particular cylinder and then the spark timing is advanced back toward the MBT (minimum spark advance for best engine torque) spark timing. For example, if the knock intensity value for cylinder number one exceeds a threshold level, then knock is indicated for cylinder number one and spark timing of cylinder number one is retarded by five crankshaft degrees. The spark timing for cylinder number one may be advanced by five crankshaft degrees within ten seconds of when the spark timing of cylinder number one was retarded based on knock. If knock is not indicated, spark timing for the cylinder remains at its requested or base timing (e.g., MBT timing). Knock for each cylinder may be determined in this way. Method 200 proceeds to exit after adjusting engine spark timing for engine knock.

At 260, method 200 judges if the engine is presently in a VDE mode and if VDE exit conditions are met. Method 200 may judge if the engine is presently operating in a VDE mode based on engine knock background noise levels as described in the method of FIG. 6. Further, method 200 may judge that VDE exit conditions are met if driver demand torque changes to a value outside of VDE mode range. Further, method 200 may judge that VDE exit conditions are present if the engine is at idle speed and/or if the vehicle's speed is less than a threshold speed. If method 200 judges that VDE exit conditions are met, the answer is yes and method 200 proceeds to 262. Otherwise, the answer is no and method 200 proceeds to 265.

At 262, method 200 judges if exiting VDE mode and entering all cylinder mode changes an engine knock background noise level. In one example, method 200 may judge that an engine knock background noise level changes if a fuel injector is commanded off (e.g., fuel injector control action) in a knock window in which the fuel injector was not commanded off during the most recent previous engine cycle. Likewise, method 200 may judge that an engine knock background noise level changes if a fuel injector is commanded on in a knock window in which the fuel injector was not commanded on during the most recent previous engine cycle. The changing of the fuel injector control action (e.g., commanding the fuel injector off in an engine knock window where the fuel injector was not previously commanded off) in an engine knock window (e.g., the knock window for cylinder number two) may be indicative of a change in an engine knock background noise level. If method 200 judges that entering all active cylinder mode will cause a change in the engine knock background noise level, the answer is yes and method 200 proceeds to 264. Otherwise, the answer is no and method 200 proceeds to 265.

At 264, method 200 adjusts the fuel injection mode from all engine cylinder mode to reduce the possibility of changes to the engine knock background noise levels for each engine knock window during the cylinder cycle. The fuel injection is adjusted according to the method of FIG. 7. Method 200 proceeds to 265 after adjusting the fuel injection mode.

At 265, method 200 activates all engine cylinders and poppet valves of the cylinders. The fuel injectors are also activated in their base operating mode and spark is supplied to all the engine cylinders. Method 200 proceeds to 218 after activating all engine cylinders.

In this way, engine cylinder density, fuel injection timing, and firing pattern may be adjusted to mitigate changes to engine knock background noise levels. Further, known engine knock background noise levels may be stored to controller memory for particular VDE and non-VDE modes so that the possibility of false knock indications or the possibility of missing knock after an engine mode change may be reduced.

Figure 2:
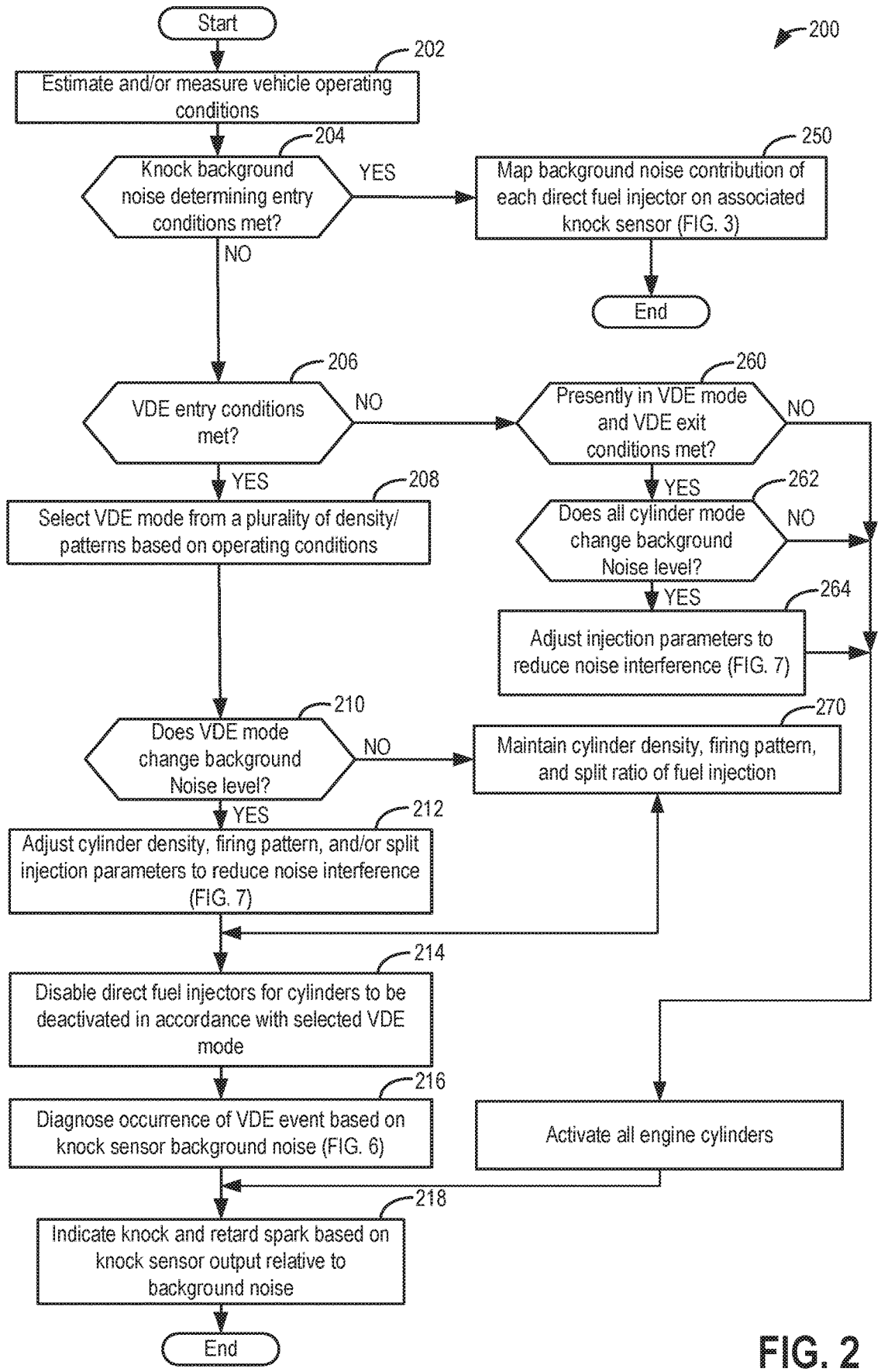
FIG. 2 shows a high level flow chart of a way to operate a variable displacement engine that includes controlling and determining engine knock background noise levels for engine cylinders.

It should also be noted that the method of FIG. 2 may change fuel injector timing, cylinder firing pattern, and cylinder density of a selected VDE mode by determining whether or not entering the selected VDE mode would cause engine knock background noise levels of engine cylinders to change. If a change in the engine knock background noise levels is determined, then actions may be taken so that the level of engine knock background noise for fewer engine cylinders is changed when a new VDE mode is entered. However, in alternative examples, method 200 may actually engage the selected VDE mode and then make the adjustments described herein if engine knock background noise level changes are observed. Thus, the selected VDE mode may be activated at 208 and method 200 may judge if the activated VDE mode changed engine knock background noise levels at 210. Then, the same mitigating actions may be taken if changes to the engine knock background noise levels are observed.

Figure 3:
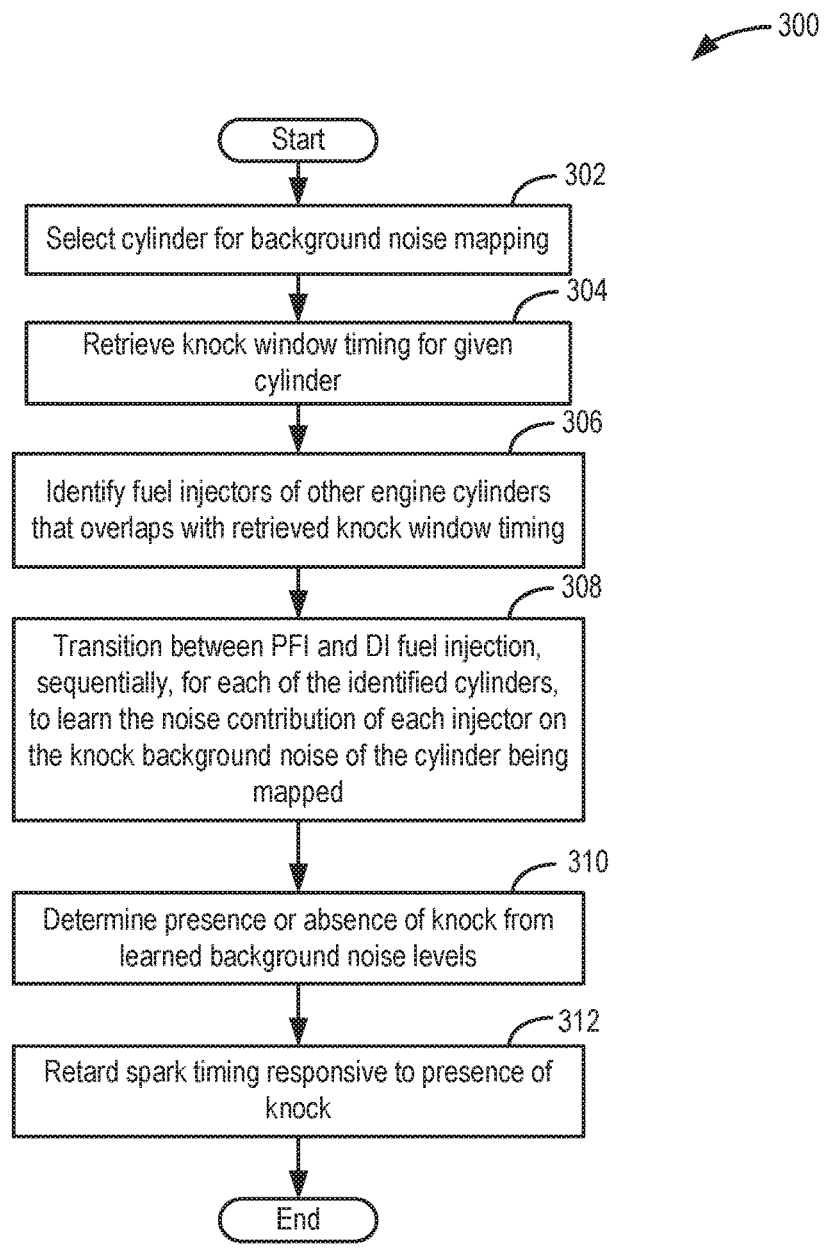
FIG. 3 shows a flow chart of a method for determining engine knock background noise levels for a variable displacement engine.

Referring now to FIG. 3, a method for determining engine knock background noise levels for a variable displacement engine is shown. The method includes determining engine knock background noise levels for utilizing different types of fuel injection (e.g., DI and PFI).

At 302, method 300 selects a cylinder for engine knock background noise level mapping. In one example, method 300 begins by selecting the first cylinder in the engine's firing order and then sequentially selects the other cylinders in firing order after having mapped engine knock background noise level for the first cylinder in the engine's firing order. For example, for a four cylinder engine having a firing order of 1-3-4-2, method 300 first selects cylinder number one for engine knock background noise level mapping and then method 300 selects cylinder number three for engine knock background noise level mapping, and so on. Method 300 proceeds to 304 after selecting the cylinder for engine knock background noise level mapping.

At 304, method 300 retrieves knock window timing for the selected cylinder. Method 300 may retrieve the knock window timing from controller memory. In one example, the knock window timing for the selected cylinder is from five crankshaft degrees after top-dead-center compression stroke of the selected cylinder to sixty degrees after top-dead-center compression stoke of the selected cylinder. In other examples, the knock windows may have other timings (e.g., knock and knock background noise are assessed for the selected cylinder during the crankshaft interval of the knock window for the selected cylinder). Method 300 proceeds to 306.

At 306, method 300 identifies other engine cylinders that have fuel injection control action timing that overlaps with the knock window timing of the selected cylinder. The identity of the other engine cylinders may also be retrieved from memory based on the selected cylinder. Alternatively, start of injection (SOI) timing (e.g., crankshaft angle) and end of injection timing (EOI) timing for each cylinder may be compared to the selected engine knock window timing that was determined at 304. If the SOI or EOI timing of a fuel injector of a cylinder is within the selected engine knock window, then the injectors of the other engine cylinders are identified as having timing that overlaps with the selected knock window. If a fuel injector's SOI or EOI occurs contemporaneously with the selected engine knock window, the fuel injectors control action (e.g., opening or closing the fuel injector) at SOI or EOI may affect the engine knock background noise level that is determined during the selected engine knock window. Method 300 proceeds to 308 after identifying fuel injectors that have control actions that overlap or that occurs contemporaneously with the selected engine knock window.

At 308, method 300 method selectively activates and deactivates fuel injectors that have control actions that overlap with the selected engine knock window. For example, if DI injector of cylinder number six is shut off during the knock window of cylinder number three, then the engine knock background noise level is determined for cylinder number three with the DI injector of cylinder number six operating as usual (e.g., closing during the knock window of cylinder number three). The engine background noise level is then stored to controller memory as the engine background noise level for cylinder number three when cylinder number six is combusting fuel. Next, the DI fuel injector for cylinder number six is deactivated so that the DI fuel injector of cylinder number six does not close during the engine knock window of cylinder number three. Then, the engine knock background noise level for cylinder number three is determined. This engine knock background noise level for cylinder number three is stored in controller memory as the background noise level for cylinder number three when the engine is operated with the DI injector of cylinder number three being deactivated. Engine knock background noise levels for PFI injection that has control actions that occur contemporaneously with the engine knock window of the selected cylinder number may be determined and stored to controller memory in a similar way.

In one example, engine knock background noise levels are determined via filtering and integrating engine knock sensor output that occurs during the engine knock window of the selected cylinder. Further, the present engine knock background noise level may be constructed from an average of a predetermined number of past engine knock background noise levels for the selected cylinder. Method 300 proceeds to 310 after determining the background noise levels for the selected cylinder.

At 310, method 300 determines the presence or absence of engine knock from the background noise levels. In particular, method 300 retrieves engine knock background noise levels for engine cylinders that are combusting fuel during the present engine cycle. Further, the engine background noise levels are selected and retrieved from memory based on the presence or absence of control actions of fuel injectors that occur during selected engine knock windows. For example, if engine knock for cylinder number three is being assessed and the DI fuel injector for cylinder number six is activated (the DI injector of cylinder number six closes during the knock window of cylinder number three), then method 300 retrieves the engine knock background noise level for cylinder number three that corresponds to when the engine is operated with fuel DI fuel injector of cylinder number six being activated. Method 300 determines the engine knock intensity level for each cylinder by integrating output of the knock sensor during the particular engine cylinder's knock window and dividing the integrated knock sensor output by the engine knock background noise level for the particular cylinder. If the knock intensity level exceeds a threshold, then knock is indicated for the particular cylinder. Each engine cylinder may be evaluated for the presence or absence of knock in a similar way.

At 312, method 300 retards spark timing of engine cylinders for which knock is indicated. The engine may be operated with base spark timing that is near MBT spark timing. If knock is detected for a particular cylinder, then spark timing for the cylinder in which knock was detected may be retarded from MBT spark timing by a predetermined amount. The spark of the cylinder in which knock was detected may be advanced over time so that fuel economy losses may be reduced. Method 300 proceeds to exit.

In this way, engine knock background noise levels may be determined and applied to determine the presence or absence of engine knock. The estimates of engine knock background noise levels may include noise from direct and port fuel injectors.

Figure 4:
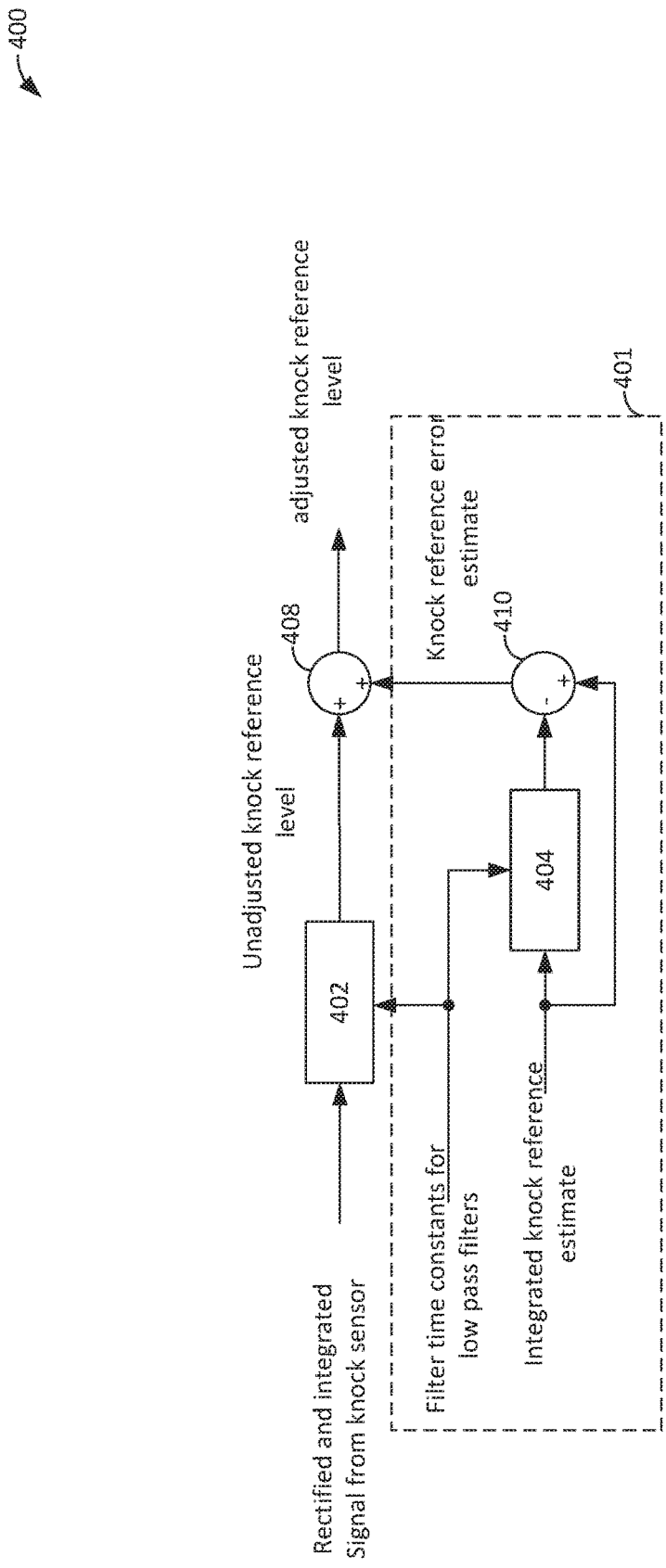
FIG. 4 shows a block diagram of an observer for estimating engine knock background noise levels for a variable displacement engine.
Figure 5:
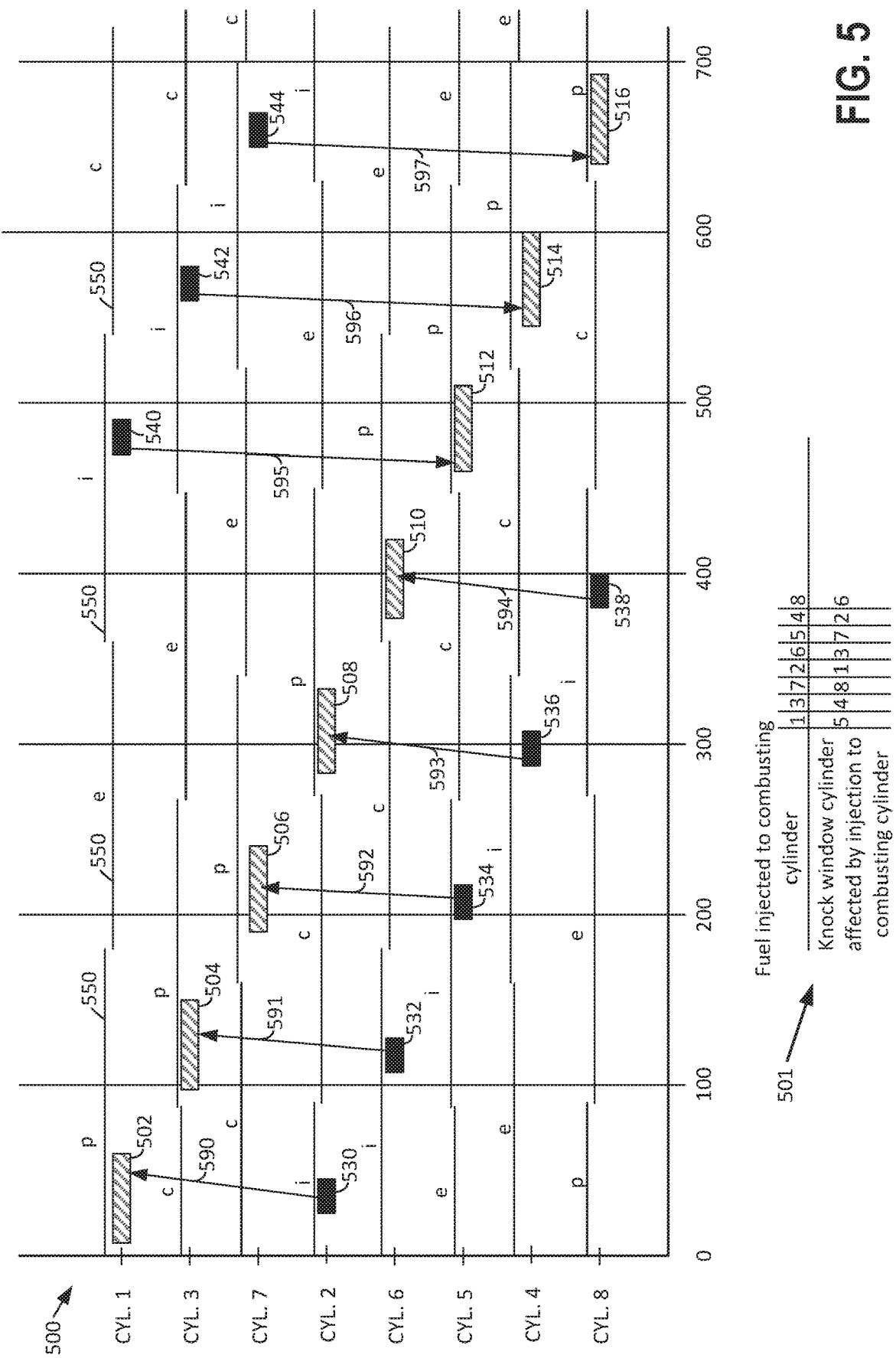
FIG. 5 shows a timing diagram that illustrates how fuel injection control actions for one engine cylinder may influence a background engine knock noise level for a different engine cylinder.

Referring now to FIG. 4, an example observer for estimating engine knock background noise is shown. Block diagram 400 includes an observer section 401 that provides output to summing junction 408. The output of the engine knock sensor is rectified and integrated before it is input to low pass filter 402. The knock sensor signal that is input to low pass filter 402 is output of the knock sensor that occurs during a cylinder knock window. The a cylinder knock window is open to allow output of the knock sensor to the low pass filter during a predetermined crankshaft interval for the cylinder being evaluated for knock. Each cylinder has a knock window as is shown in FIG. 5. Low pass filter 402 has a cut-off frequency that is based on the filter time constant (e.g., scalar numerical value) that is input to the low pass filter 402. Output of the knock sensor during a knock window is dependent on engine speed, fuel injection timing, and fuel injection duration since fuel injector opening and closing may be during the knock window. The output of low pass filter 402 is relayed to summing junction 408 as an unadjusted engine knock background noise reference level. The output of summing junction 408 is an adjusted engine knock background noise level.

Observer 401 receives an engine knock background noise reference estimate that estimated from the following equation:

INTKNK_DELTA_EST[icyl]=lookup_3d (INTKNK_DELTA_INJ(icyl,rpm) where INTKNK_DELTA_EST is integrated knock background noise reference estimate, icyl is the cylinder for which the integrated knock background noise reference estimate applies; lookup_3d is a three dimensional lookup table of empirically determined values that are a function of engine speed and the cylinder for which the integrated knock background noise reference applies. The value of INTKNK_DELTA_EST is input to low pass filter 404. The output of low pass filter 404 is subtracted from the value of INTKNK_DELTA_EST at 410 and the result is input into summing junction 408. Observer 401 provides a feedforward correction to the engine knock background noise level determined from the engine knock sensor. If the fuel injector control action (e.g., open or close) is outside of the engine knock background noise window, then INTKNK_DELTA_EST=0.

Referring now to FIG. 5, a timing sequence 500 that shows example engine knock background noise window timing is shown. The illustrated timings are for an eight cylinder engine that has a firing order of 1-3-7-2-6-5-4-8. The engine is a four stroke engine that has a cycle of 720 crankshaft degrees. The engine crankshaft degrees are located along the horizontal axis and zero degrees represents top-dead-center compression stroke for cylinder number one. The eight cylinders are labeled along the vertical axis.

The engine knock window for cylinder number one is indicated by slash bar 502. Knock windows for the remaining engine cylinders (2-8) are indicated by similar slash bars (504-516) that align with labeling along the vertical axis. Solid bar 530 represents a DI fuel injector open interval for cylinder number two. The DI fuel injector for cylinder number two is closed when solid bar 530 is not visible. The DI fuel injector for cylinder number two opens at the left side of solid bar 530 and closes at the right side of solid bar 530. DI fuel injections for the remaining engine cylinders (2-8) are indicated by similar solid bars (532-544) and they follow the same convention as solid bar 530. The fuel injector bars 530-544 respectively align with cylinders listed along the vertical axis that the fuel injector bars correspond to.

Strokes for cylinder number one are indicated by horizontal lines 550. Letters p, e, i, and c identify the power (p), exhaust (e), intake (i), and compression (c) strokes associated with cylinder number one. Strokes for the other engine cylinders are identified in a similar way.

FIG. 5 also includes table 501 that describes the relationship between DI fuel injection for one cylinder and engine knock background noise level for another cylinder as is illustrated in sequence 500. Table 501 includes a first label that indicates to which cylinder fuel is injected for combustion. The engine cylinder numbers arranged in the engine's firing order 1-3-7-2-6-5-4-8. The second label indicates the knock window of the cylinder that is affected by fuel injection to the cylinders combusting. Table 501 shows that the knock window of cylinder 5 is affected by fuel that is injected to combust in cylinder 1 (cylinder 1 is located above cylinder 5 in the table). Table 501 also shows that the knock window of cylinder 4 is affected by fuel that is injected to combust in cylinder 3, and so on. Thus, when fuel is directly injected to one cylinder, it may affect the engine knock background noise level of a cylinder that is three cylinders behind in the engine's order of combustion. Timings and interrelationships between port fuel injectors and cylinder knock windows may be described in a similar way.

Thus, it may be observed that opening and closing of the DI fuel injector for cylinder number two occurs during the knock window of cylinder number one. This timing relationship is indicated by arrow 590. Similar relationships between DI injectors and engine knock windows are indicated by arrows 591-597. Consequently, the opening and closing of the DI injectors may increase the engine knock background noise levels of engine cylinders when the DI injectors are activated. The engine background noise levels of the engine cylinders may be reduced when the DI injectors are not activated.

Figure 6:
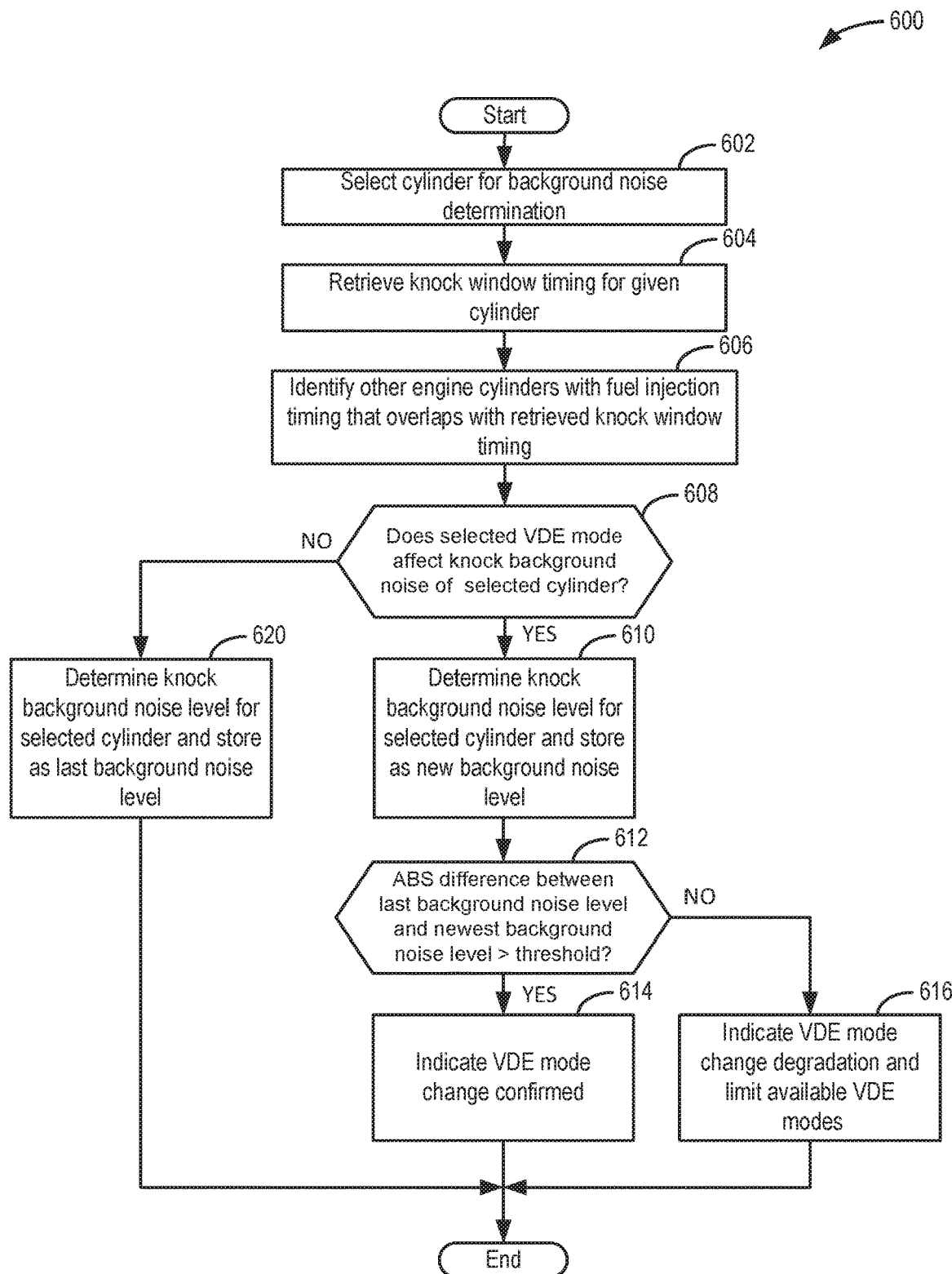
FIG. 6 shows a method for diagnosing whether or not engine cylinders are deactivated in a VDE mode based on engine knock background noise levels.
Figure 7:
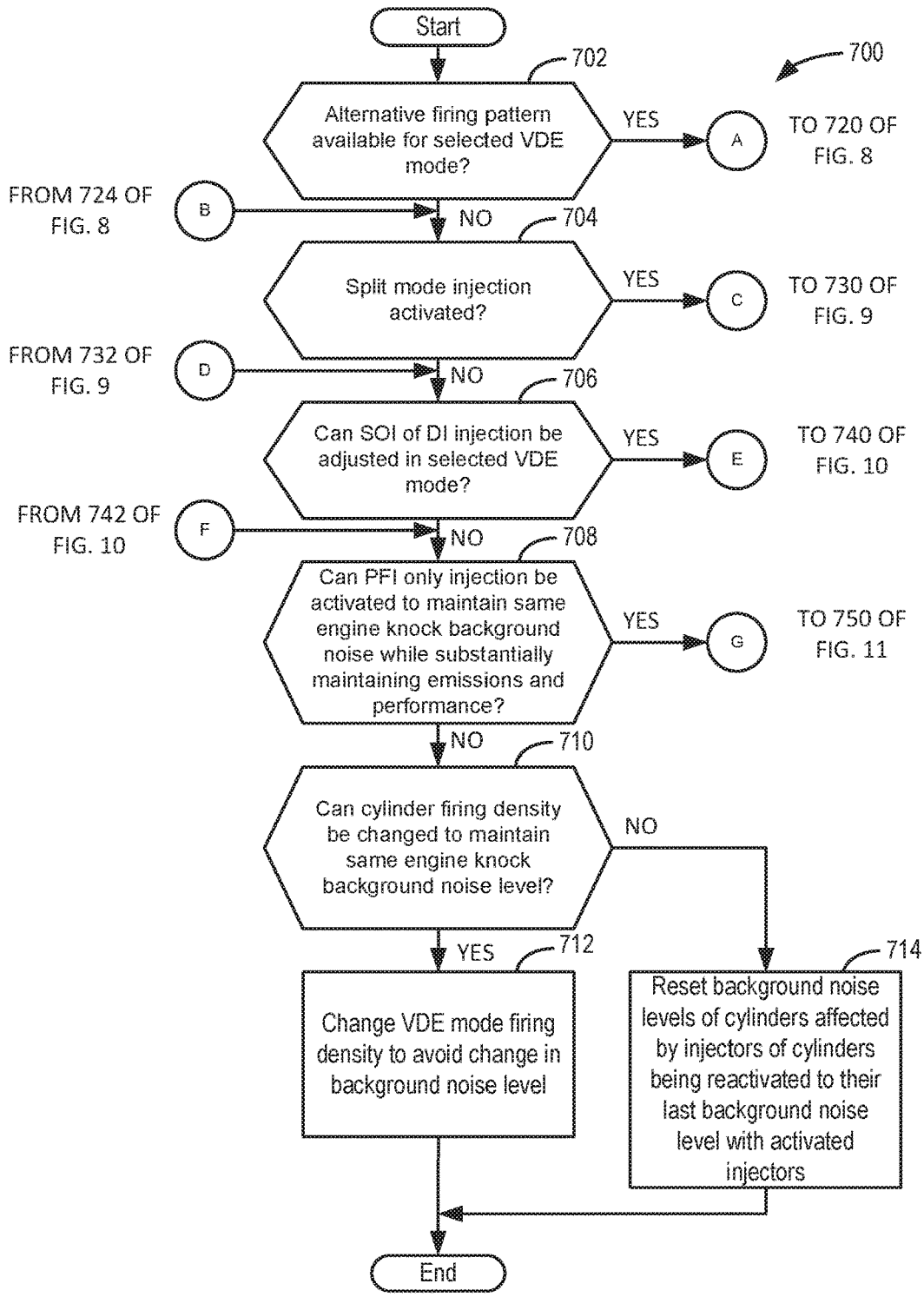
FIGS. 7-11 show a flow chart for adjusting VDE mode, injector timing, and injector mode to provide more consistent engine knock background noise levels in the presence of VDE mode changes.
Figure 8:
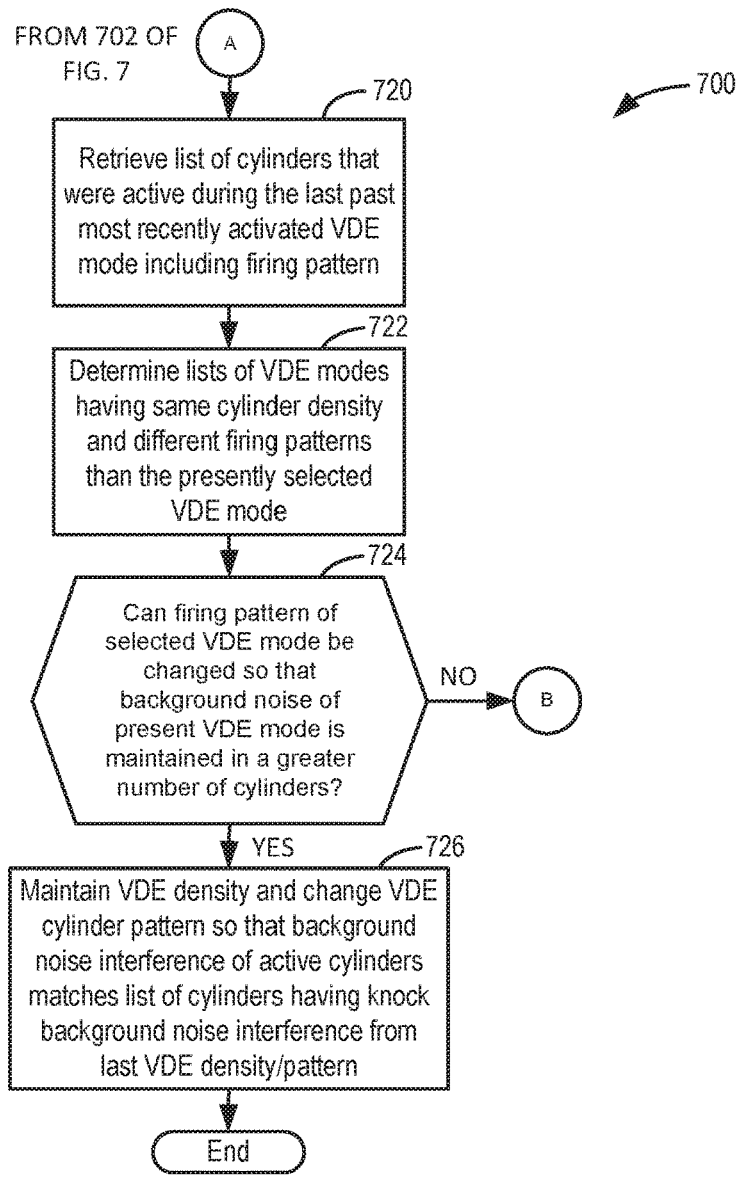
Figure 9:
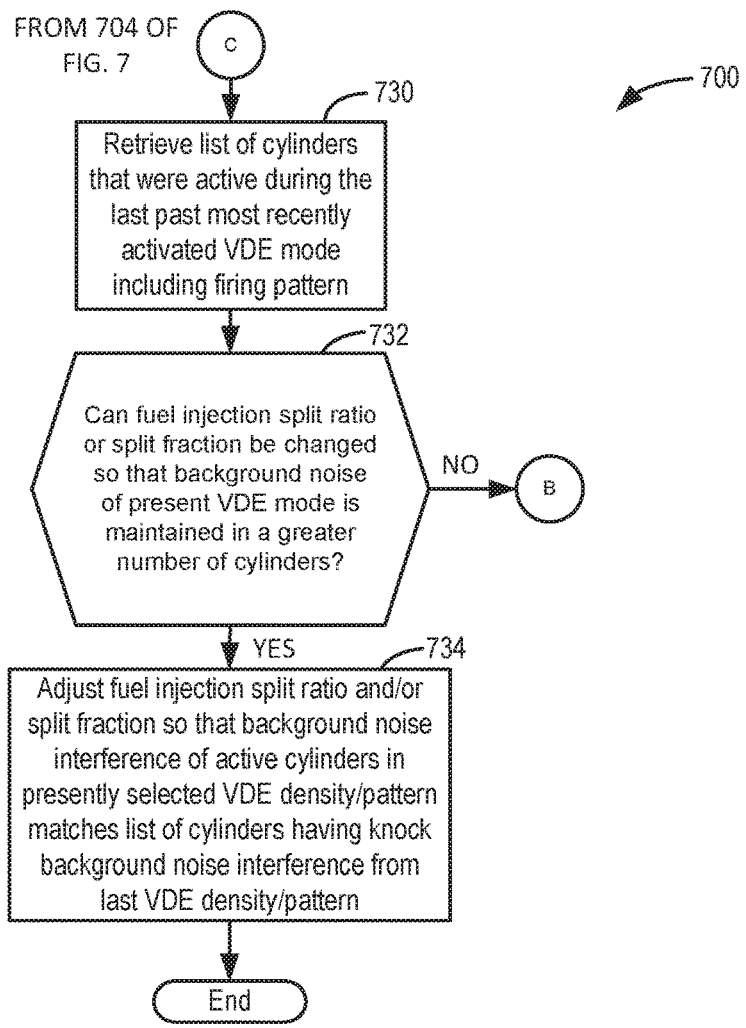
Figure 10:
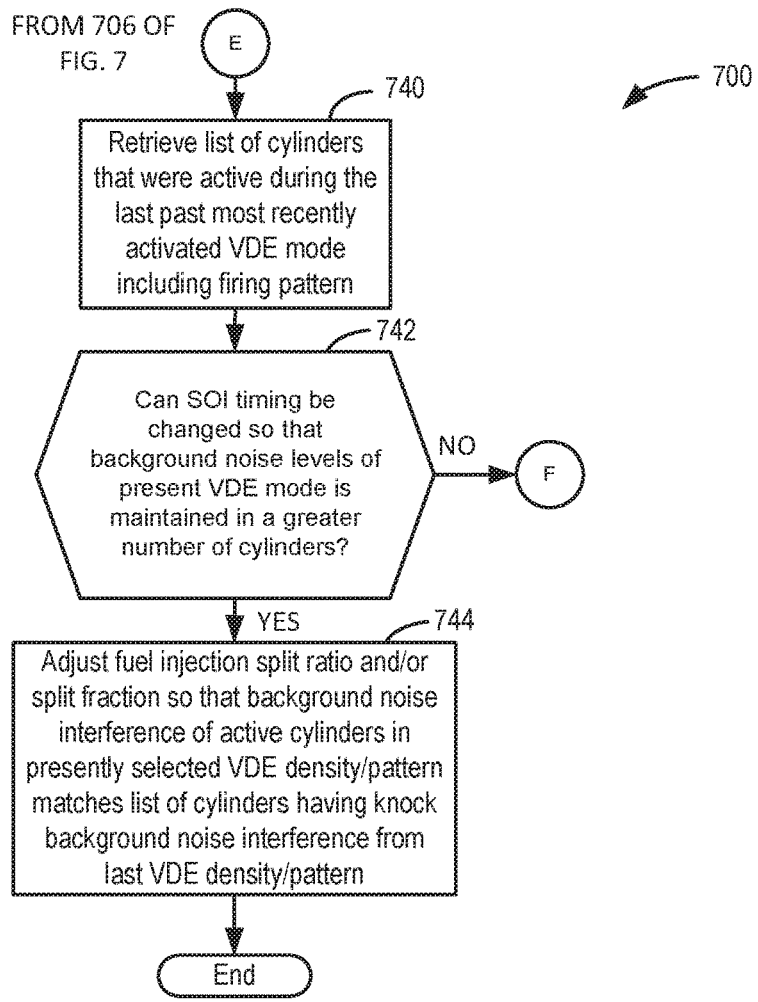
Figure 11:
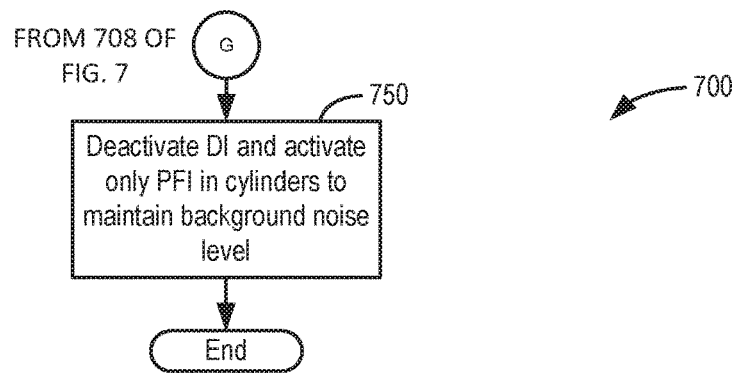

Referring now to FIG. 6, a method for diagnosing whether or not engine cylinders are deactivated in a VDE mode based on engine knock background noise levels is shown. The engine knock background noise level for an engine cylinder may change depending on whether or not fuel injector control actions (e.g., opening or closing the fuel injector) are taken during an engine knock window when the engine knock background noise level is determined. If the fuel injector is opened or closed during the crankshaft interval when the knock window for a particular cylinder is open, then the engine knock background noise level for the particular engine cylinder may increase because of noise and vibration caused by opening or closing the fuel injector. However, if the fuel injector is not opened or closed during the crankshaft interval when the knock window for a particular cylinder is open, then the engine knock background noise level for the particular engine cylinder may decrease because of lack of noise and vibration from the fuel injector.

At 602, method 600 selects a cylinder for engine knock background noise level determination. In one example, method 600 begins by selecting the cylinder based on engine position. The selected cylinder is a cylinder that is at a predefined crankshaft angle that defines the cylinder's knock window or a cylinder that is nearest its predefined crankshaft angle that defines the cylinder's knock window without being at a crankshaft angle in the cylinder's knock window. For example, if the engine is at ten degrees after top-dead-center compression stroke for cylinder number one and cylinder number one's knock window is from five degrees after top-dead-center compression stroke to sixty degrees after top-dead-center compression stroke of cylinder number one, then cylinder number one is selected because the engine is within the knock window of cylinder number one. Method 600 proceeds to 604 after selecting the cylinder for engine knock background noise level determination.

At 604, method 600 retrieves knock window timing for the selected cylinder. Method 600 may retrieve the knock window timing from controller memory. In one example, the knock window timing for the selected cylinder is from five crankshaft degrees after top-dead-center compression stroke of the selected cylinder to sixty degrees after top-dead-center compression stoke of the selected cylinder. In other examples, the knock windows may have other timings (e.g., knock and knock background noise are assessed for the selected cylinder during the crankshaft interval of the knock window for the selected cylinder). Method 600 proceeds to 606.

At 606, method 600 identifies other engine cylinders that have fuel injection control action timing that overlaps with the knock window timing of the selected cylinder. The identity of the other engine cylinders may also be retrieved from memory based on the selected cylinder. Alternatively, start of injection (SOI) timing (e.g., crankshaft angle) and end of injection timing (EOI) timing for each cylinder may be compared to the selected engine knock window timing that was determined at 604. If the SOI or EOI timing of a fuel injector of a cylinder is within the selected engine knock window, then the injectors of the other engine cylinders are identified as having timing that overlaps with the selected knock window. If a fuel injector's SOI or EOI occurs contemporaneously with the selected engine knock window, the fuel injectors control action (e.g., opening or closing the fuel injector) at SOI or EOI may affect the engine knock background noise level that is determined during the selected engine knock window. Method 600 proceeds to 608 after identifying fuel injectors that have control actions that overlap or that occurs contemporaneously with the selected engine knock window.

At 608, method 600 judges if the selected VDE mode from 208 or 212 of FIG. 2 affects operation of the cylinder selected at 602 for engine knock background noise determination. A cylinder that is newly deactivated in the present engine cycle due to the selected VDE mode may affect the engine knock background noise level for the cylinder that is selected for engine knock background noise determination. For example, if the DI injector of cylinder number two closes in the knock window of cylinder number one when cylinder number two is active, and the DI injector of cylinder number two is not activated for the present cylinder cycle due to the selected VDE mode, then method 600 may judge that the selected VDE mode affects the engine knock background noise level of the cylinder that is selected for engine knock background noise level determination (e.g., cylinder number one). If method 600 judges that the selected VDE mode affects engine knock background noise level determination for the engine cylinder that is selected for engine knock background noise level determination, the answer is yes and method 600 proceeds to 610. Otherwise, the answer is no and method 600 proceeds to 620.

At 620, method 600 determines an engine knock background noise level for the cylinder that was selected at 602 and stores the engine knock background noise level to controller memory. The engine knock background noise level is stored in a memory location that may be referenced by the selected cylinder number, the presently selected VDE mode (including all cylinders active mode). Further, the engine knock background noise level is stored as the last engine knock background noise level determined. The engine knock background noise level may be determined via integrating a portion of the knock window of the selected engine cylinder. Method 600 proceeds to exit.

At 610, method 600 determines an engine knock background noise level for the cylinder that was selected at 602 and stores the engine knock background noise level to controller memory. The engine knock background noise level is stored in a memory location that may be referenced by the selected cylinder number, the presently selected VDE mode (including all cylinders active mode). Further, the engine knock background noise level is stored as the new engine knock background noise level. Method 600 proceeds to 612.

At 612, method 600 judges if the absolute value (ABS) of the difference between the last engine knock background noise level and the new engine knock background noise level exceeds a threshold level. If so, the answer is yes and method 600 proceeds to 614. Otherwise, the answer is no and method 600 proceeds to 616. A yes answer is indicative that the VDE mode has change as commanded because a change in the fuel injector control action has been identified. A no answer is indicative that the VDE mode has not changes as commanded because the observed fuel injector control action has not been identified by the engine knock background noise level changing.

At 616, method 600 indicates that the VDE mode has not changed as expected. Method 600 may limit the number of available VDE modes and indicate that VDE mode degradation is present. For example, method 600 may inhibit V6S and V4S modes in a V8 engine when VDE mode degradation is determined. The VDE modes may be limited to reduce the possibility of engine degradation and engine emission degradation. Method 600 proceeds to exit.

At 614, method 600 indicates that the VDE mode has changed as expected. Thus, method 600 may signal that the engine is operating as is expected. Method 600 proceeds to exit.

In this way, method 600 may determine the presence or absence of VDE mode degradation. The VDE mode degradation may be based on an engine knock background noise level determinations. In addition, other VDE mode degradation methods may be combined with the method of FIG. 6 to improve engine diagnostics.

Referring now to FIGS. 7-11, a method for adjusting VDE mode, injector timing, and fuel injector mode to provide more consistent engine knock background noise levels in the presence of VDE mode changes is shown. During VDE mode changes, the total number of active engine cylinders may increase or decrease. If cylinders are deactivated, then engine knock background noise levels for some active cylinders may decrease due to fuel injectors of deactivated cylinders being deactivated. Because control actions (e.g., turning on and turning off) of fuel injectors for one cylinder may occur within an engine knock window of another cylinder (as shown in FIG. 5), activating or deactivating some cylinders due to a VDE mode change may change engine knock background noise levels determined for other cylinders during the knock window of the other cylinder. Therefore, it may be desirable to modify the VDE mode, fuel injector timing, and/or fuel injection mode to reduce engine knock background noise changes that may be due to a VDE mode change. Although method 700 shows a particular order for judging whether or not the selected VDE mode may be modified to maintain engine knock background noise level, the order of judging whether particular conditions (e.g., SOI timing, etc.) may be rearranged if desired.

At 702, method 700 judges if there is an alternative cylinder firing pattern that is available to activate since the presently selected VDE may affect the engine knock background noise levels. Method 700 may retrieve available VDE modes from controller memory and compare cylinder firing patterns for the presently selected VDE mode with cylinder firing patterns for available VDE modes that are presently not selected. Available alternative cylinder firing patterns are VDE modes that include the same total number of activated cylinders as the selected VDE mode, but the alternative available VDE modes must also have a different firing order than the selected VDE mode. For example, if the presently selected VDE mode for a V8 engine having a firing order of 1-3-7-2-6-5-4-8 is a V4S mode with a firing order of 1-7-6-4 and a V4S mode with a firing order of 3-2-5-8 is available, then the answer is yes and method 700 proceeds to 802 of FIG. 8. Otherwise, if an alternative cylinder firing pattern is not available, then the answer is no and method 700 proceeds to 704.

At 704, method 700 judges if split fuel injection mode is activated for the presently selected VDE mode. Split injection modes are modes where more than a single fuel injection is provided via a single fuel injector to a single cylinder. For example, a direct fuel injector may inject once during an intake stroke and a second time during a compression stroke for the selected VDE mode. Such operation or scheduling of fuel injection would be determined as being a split injection mode by method 700. If method 700 determines that split fuel injection is activated or enabled for the present VDE mode, then the answer is yes and method 700 proceeds to 902 of FIG. 9. Otherwise, the answer is no and method 700 proceeds to 706.

At 706, method 700 judges if start of injection (SOI) timing (e.g., engine crankshaft angle) for the presently selected VDE mode may be adjusted. Start of injection timing for a cylinder is the earliest crankshaft angle during a cycle of the cylinder at which the fuel injector (PFI or DI) injector is opened, and the SOI timing may be adjusted responsive to engine operating conditions. Earliest SOI for a port fuel injector during a present cylinder cycle is at the crankshaft angle that the intake valve closes during a last prior cycle of the cylinder. Earliest SOI for a direct fuel injector of the same cylinder may be exhaust valve closing (EVC) for a last previous cycle of the cylinder. Thus, PFI may be allowed to start at a much earlier SOI injection time than DI. In addition, there may also be other constraints on SOI injection time. For example, SOI for DI injectors may be constrained to be after top-dead-center intake stroke to ensure that most DI fuel remains in the engine cylinder. The PFI and DI injection times for the presently selected VDE mode and the earliest PFI and DI injection times may be retrieved from controller memory. If the DI injection time for the presently selected VDE mode is later than the earliest DI injection time, then the DI injection SOI time may be advanced. Likewise, if the PFI injection time for the presently selected VDE mode is later than the earliest PFI injection time, then the PFI injection SOI time may be advanced. Method 700 judges if the SOI timing for PFI and DI injectors may be adjusted to a time that is earlier than the base SOI timing for the presently selected VDE mode, the answer is yes and method 700 proceeds to 740 of FIG. 10. Otherwise, the answer is no and method 700 proceeds to 708.

At 708, method 700 judges if PFI only (e.g., a cylinder is operated without supplying fuel to the cylinder via a DI fuel injector for one or more engine cycles when the cylinder is combusting fuel) may be activated on selected cylinders to maintain engine knock background noise levels for one or more engine cylinders when activating the selected VDE mode will increase engine knock background noise levels for engine cylinders. For example, if a V8 is operating in a V4S VDE cylinder mode (2-by-4 cylinder density with firing order of 1, 7, 6, 4) with only active DI fuel injectors and the selected VDE mode is changed to V6S VDE (3-by-4 cylinder density with firing order of 1, 7, 2, 6, 4, 8), method 700 may judge that cylinders 2 and 8 may be reactivated with PFI only injection so that engine knock background noise levels will not change due to PFI injectors closing before the knock windows of cylinders 1 and 6 are opened. If the 3-by-4 cylinder mode were activated with DI injections from cylinders 2 and 8, the engine knock background noise levels of cylinders 1 and 6 may have changed from a lower level to a higher level because cylinders 2 and 8 were deactivated in the last most recent engine cycle.

On the other hand, if the last most recent VDE mode was V6S (3-by-4 cylinder density with firing order of 1, 7, 2, 6, 4, 8 and all cylinders in DI only injection mode) and the selected VDE mode is V4S (2-by-4 cylinder density with firing order of 1, 7, 6, 4), then activating PFI injectors in active cylinders in the V4S mode would not change engine knock background noise levels for active cylinders 1, 7, 6, and 4. Therefore, method 700 would not operate the active cylinders in the selected VDE mode (cylinders 1, 7, 6, and 4) in PFI only mode. If method 700 judges that PFI only injection can be activated to maintain engine knock background noise levels for one or more cylinders, the answer is yes and method 700 proceeds to 750 of FIG. 11. Otherwise, the answer is no and method 700 proceeds to 710.

Method 700 may also require that desired engine torque and engine emissions be achieved by operating the select engine cylinders in PFI only mode. Method 700 may reference engine torque levels and emissions levels that are available when cylinders are operated in PFI mode to determine if the desired engine torque and engine emissions may be provided by operating cylinders in PFI only mode. If the desired engine torque and engine emissions may not be provided by operating some cylinders in PFI only mode, then method 700 may proceed to 710 without activating the cylinders in PFI only mode.

At 710, method 700 judges if the cylinder firing density may be changed to maintain a same level of engine knock background noise level for at least a portion of active (e.g., cylinders combusting fuel) engine cylinders that was present in the past last most recent VDE mode. Method 700 may search through available VDE modes to find a VDE mode that provides a same level of engine knock background noise level for at least a portion of active engine cylinders as was present in the last most recent VDE mode while also verifying that the available VDE modes meet the driver demand torque and engine noise and vibration limits. For example, if the last most recent VDE mode was stationary 3-by-4 cylinder density with firing order of 1, 7, 2, 6, 4, 8 and the selected mode for the present engine cycle is rolling 1-by-3 with a firing order of 1, 2, 4, first engine cycle; 3, 6, 8 second engine cycle; and 7 and 5 third engine cycle before repeating, then method 700 may judge that the cylinder firing density may be change to a stationary 2-by-4 cylinder density with a firing order of 1, 7, 6, 4 to preserve engine background knock noise levels for at least a portion of active engine cylinders of the present VDE mode. Thus, the selected VDE mode may be replace with an alternative VDE mode of a different cylinder density to maintain engine knock background noise levels in at least a portion of the cylinders that are active during the presently activated VDE mode. If method 700 judges that the cylinder firing density may be changed to maintain a same level of engine knock background noise as present in at least a portion of cylinders of the present VDE mode, then the answer is yes and method 700 proceeds to 712. Otherwise, the answer is no and method 700 proceeds to 714.

At 712, method 700 changes the selected VDE mode to a new VDE mode that has a different cylinder firing density than the selected VDE mode. Thus, the VDE mode selected at 208 is not activated and it is replaced via a VDE mode that has a different cylinder firing density. The VDE mode that replaces the selected VDE mode may be determined via referencing VDE modes stored in memory and comparing fuel injector operation of VDE modes taken from memory against the fuel injector operation in the past last most recent VDE mode. The newly activated VDE mode maintains the engine knock background noise level for at least a portion of active engine cylinders of the presently activated VDE mode. The VDE mode is activated by activating or deactivating select fuel injectors and poppet valves of cylinders that are activated or deactivated. Method 700 proceeds to exit.

At 714, method 700 resets engine knock background noise levels of engine cylinders being reactivated to in the selected VDE mode to values that have been previously stored in controller memory (e.g., at 250 of FIG. 2). When formerly deactivated engine cylinders are reactivated, the engine knock background noise level of other engine cylinders may be at a low level because the fuel injectors of the formerly deactivated cylinder were not opening and closing. For example, for an eight cylinder engine having a firing order of 1-3-7-2-6-5-4-8, if cylinders 2, 3, and 5 were deactivated and are being reactivated in the present or next engine cycle due to a VDE mode change, then the engine knock background noise level of cylinders 1, 4, and 7 (injector noise from cylinders 2, 3, and 5 may be aligned with knock windows of cylinders 1, 4, and 7) is adjusted to a previous level of engine knock background noise for the respective newly activated cylinders. Alternatively, if formerly activated engine cylinders are deactivated, then the engine knock background noise level of engine cylinders affected by injector noise from the newly deactivated engine cylinders may be allowed to naturally reduce, or alternatively, the may be reduced to a value that is stored in controller memory from a previous time that the engine operated in the VDE mode that is being activated for the present engine cycle. Method 700 proceeds to exit.

At 720, method 700 retrieves a list of engine cylinders that are activated in the presently activated VDE mode including the cylinder firing pattern. The list may be updated each time the engine enters a new VDE mode. For example, if during the present engine cycle, the engine is operated in V6S mode with cylinders 1, 7, 2, 6, 4, and 8 being active, then method 700 retrieves a list including cylinders 1, 7, 2, 6, 4, and 8. Method 700 proceeds to 722.

At 722, method 700 accesses memory and retrieves lists of VDE modes that have the same cylinder firing density as the presently selected VDE mode, but that have alternative firing patterns. For example, if the presently selected VDE mode for a V8 engine having a firing order of 1-3-7-2-6-5-4-8 is a V4S mode with a firing order of 1-7-6-4, then method 700 may retrieve a VDE mode of V4S mode with a firing order of 3-2-5-8 from memory. The specific VDE modes may vary depending on engine configuration and noise and vibration characteristics of the VDE modes. Method 700 proceeds to 724 after retrieving lists of VDE modes that have the different firing patterns and the same cylinder density as the presently selected VDE mode.

At 724, method 700 judges if the presently selected VDE mode may be changed to a VDE mode with a different firing pattern and same cylinder density as the presently selected VDE mode. Method 700 may also require that any change to the selected VDE mode be a VDE mode that has the greatest number of the same or substantially same (e.g., within 5%) engine knock background noise levels as the presently activated VDE mode. For example, if the presently activated VDE mode was V6S with a firing order of 1-7-2-6-4-8 and the selected VDE mode is V4S with a firing order of 3-2-5-8, then method 700 may replace the selected VDE mode with a V4S mode with a firing order of 1-7-6-4 to maintain the engine background noise levels for cylinders 5, 8, 3, and 2, which may be affected by fuel injector noise from operating cylinders 1, 7, 6, and 4 (as shown in FIG. 5). Further, by changing the firing order to 1-7-6-4, the engine background noise levels of cylinder 5, 8, 3, 7, 2, and 6 may not be changed because fuel injector control states of these cylinders are not modified. Thus, method 700 may select a cylinder firing frequency that changes the fewest engine knock background noise levels of the engine cylinders. Note that there is one engine background noise level for each cylinder as is shown in FIG. 5. If method 700 judges that the selected VDE mode may be changed to a VDE mode with a different firing pattern and same cylinder density as the selected VDE mode, and that the selected VDE mode is going to be changed to a VDE mode that has a same or substantially same (e.g., within 5%) engine knock background noise levels for a greatest total number of engine cylinders as compared to other available VDE modes with the same cylinder firing density, then the answer is yes and method 800 proceeds to 726. Otherwise, the answer is no and method 700 proceeds to 704 of FIG. 7.

At 726, method 700 replaces the selected VDE mode with a VDE mode that has a same cylinder density as the selected VDE mode, but that has a different firing order than the selected VDE mode. Method 700 then activates the VDE mode by commanding selected fuel injectors and poppet valves off for at least an entire engine cycle. Method 700 proceeds to exit.

At 730, method 700 retrieves a list of engine cylinders that are activated in the presently activated VDE mode. For example, if during the present engine cycle, the engine is operated in V6S mode with cylinders 1, 7, 2, 6, 4, and 8 being active, then method 700 retrieves a list including cylinders 1, 7, 2, 6, 4, and 8. Method 700 proceeds to 732.

At 732, method 700 judges if the fuel injection split ratio or split fraction of the presently selected VDE mode may be changed to maintain the present engine knock background noise levels of the presently activated VDE mode in the selected VDE mode. In one example, method 700 attempts to make the actual total number of fuel injector activation events (e.g., turning on the fuel injector) and the actual total number of fuel injector deactivation events (e.g., turning off the fuel injector) in the engine knock windows (window of each cylinder) of the selected VDE mode as are in the presently activated VDE mode. For example, if the present VDE mode is V6S with a firing order of 1-7-2-6-5-8 and two DI injections that occur in cylinder knock windows, and the presently selected VDE mode is V4S with a firing order of 1-7-6-4 with single DI injections that occur in cylinder knock window, then method 700 may increase the actual total number of DI injections for each active engine cylinder to two so that as many engine knock background noise levels may be maintained at level of the V6S firing order. Similarly, if the presently activated VDE mode includes one DI injection for each active engine cylinder and the presently selected VDE mode includes two DI injections for each active engine cylinder, then the DI injection of the selected VDE mode may be changed to on DI injection for each active engine cylinder of the selected VDE mode. In addition, if method 700 judges that fuel injected to a cylinder via port fuel injectors may be moved into DI injection for the cylinder (e.g., adjusting the split fraction) to maintain engine knock background noise levels in as many cylinders as is possible in the selected VDE mode, or vice versa, then method 700 adjusts the split fraction to maintain as many current engine knock background noise levels as is possible. If method 900 judges that the fuel injection split ratio or split fraction of the presently selected VDE mode may be changed to maintain the present engine knock background noise levels of the presently activated VDE mode in the selected VDE mode, then the answer is yes and method 700 proceeds to 734. Otherwise, the answer is no and method 700 proceeds to 706 of FIG. 7.

At 734, method 700 adjusts the fuel injection split ratio and/or split fraction to maintain as many of the present engine knock background noise levels in the presently active VDE mode as is possible in the selected VDE mode. The actual total number of split injections provided during an engine cylinder knock window may be increased or decreased from the split injection ratio of the selected VDE mode to maintain the engine knock background noise level in as many cylinders as is possible in the VDE mode that is activated in the present or next engine cycle. Thus, method 700 may adjust the fuel injection split ratio and/or the fuel injection split fraction by adjusting fuel injection timing of the selected VDE mode to maintain engine knock background noise levels. Method 700 proceeds to exit.

At 740, method 700 retrieves a list of engine cylinders that are activated in the presently activated VDE mode. For example, if during the present engine cycle, the engine is operated in V6S mode with cylinders 1, 7, 2, 6, 4, and 8 being active, then method 700 retrieves a list including cylinders 1, 7, 2, 6, 4, and 8. Method 700 proceeds to 732.

At 742, method 700 judges if the SOI of fuel injection of the presently selected VDE mode may be changed to maintain the present engine knock background noise levels of the presently activated VDE mode in the selected VDE mode. In one example, method 700 determines if the SOI timing of the selected VDE mode is later than the SOI timing of the presently activated VDE mode. If so, method 700 may advance SOI timing of the selected VDE mode to maintain the present engine knock background noise levels in as many cylinders as is possible in the selected VDE mode. Further, method 700 may advance SOI timing of active cylinders in the selected VDE mode if advancing the SOI timing moves fuel injector control actions in the selected VDE mode into fuel injection windows of cylinders that contain the same fuel injector control actions in the presently activated VDE mode. Likewise, method 700 may advance SOI timing of active cylinders in the selected VDE mode if advancing the SOI timing moves fuel injector control actions in the selected VDE mode out of fuel injection windows of cylinders that do not contain the same fuel injector control actions in the presently activated VDE mode. If method 700 judges the SOI of fuel injection of the presently selected VDE mode may be changed to maintain the present engine knock background noise levels of the presently activated VDE mode in the selected VDE mode, then the answer is yes and method 700 proceeds to 744. Otherwise, the answer is no and method 700 proceeds to 706 of FIG. 7.

At 744, method 700 adjusts the SOI timing to maintain as many of the present engine knock background noise levels in the presently active VDE mode as is possible in the selected VDE mode. Thus, method 700 may adjust the SOI timing of the selected VDE mode to maintain engine knock background noise levels. Method 700 proceeds to exit.

At 750, method 700 deactivates DI injectors of selected cylinders and activates only PFI injectors of the selected engine cylinders to maintain engine cylinder knock background noise levels of the present VDE mode in as many cylinders of the selected VDE mode as is possible in the selected VDE mode. Method 700 proceeds to exit.

Figure 12:
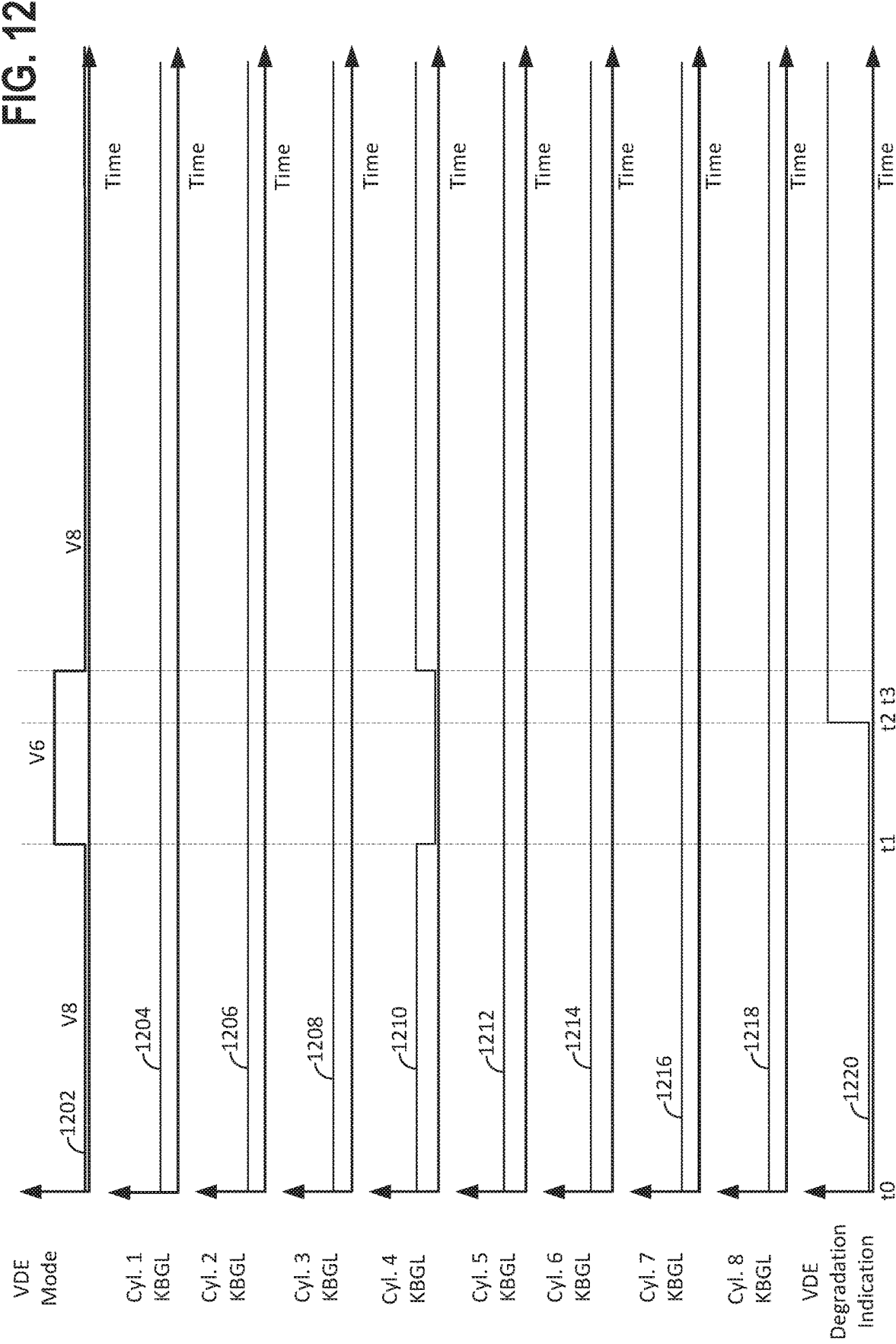
FIGS. 12-16 show example sequences where the method of FIGS. 2, 3, and 7-11 may be applied to provide more consistent engine knock background noise levels.

Referring now to FIG. 12, an example sequence that illustrates diagnosing VDE mode entry via engine knock background noise levels is shown. The sequence of FIG. 12 may be provided via the system of FIG. 1 in cooperation with the method of FIGS. 2 and 6. In this example, the engine is a four stroke V8 engine.

The first plot from the top of FIG. 12 is a plot of VDE mode versus time. The vertical axis represents VDE mode and VDE modes are identified by labels above trace 1202. Trace 1202 represents the VDE mode. The horizontal axis represents time and time increases from the left side of the plot to the right side of the plot.

The second plot from the top of FIG. 12 is a plot of engine knock background noise level for cylinder number one versus time. The vertical axis represents engine knock background noise level for cylinder number one and the engine knock background noise level for cylinder number one increases in the direction of the vertical axis arrow. Trace 1204 represents the engine knock background noise level for cylinder number one. The horizontal axis represents time and time increases from the left side of the plot to the right side of the plot.

The third plot from the top of FIG. 12 is a plot of engine knock background noise level for cylinder number two versus time. The vertical axis represents engine knock background noise level for cylinder number two and the engine knock background noise level for cylinder number two increases in the direction of the vertical axis arrow. Trace 1206 represents the engine knock background noise level for cylinder number two. The horizontal axis represents time and time increases from the left side of the plot to the right side of the plot.

The fourth plot from the top of FIG. 12 is a plot of engine knock background noise level for cylinder number three versus time. The vertical axis represents engine knock background noise level for cylinder number three and the engine knock background noise level for cylinder number three increases in the direction of the vertical axis arrow. Trace 1208 represents the engine knock background noise level for cylinder number three. The horizontal axis represents time and time increases from the left side of the plot to the right side of the plot.

The fifth plot from the top of FIG. 12 is a plot of engine knock background noise level for cylinder number four versus time. The vertical axis represents engine knock background noise level for cylinder number four and the engine knock background noise level for cylinder number four increases in the direction of the vertical axis arrow. Trace 1210 represents the engine knock background noise level for cylinder number four. The horizontal axis represents time and time increases from the left side of the plot to the right side of the plot.

The sixth plot from the top of FIG. 12 is a plot of engine knock background noise level for cylinder number five versus time. The vertical axis represents engine knock background noise level for cylinder number five and the engine knock background noise level for cylinder number five increases in the direction of the vertical axis arrow. Trace 1212 represents the engine knock background noise level for cylinder number five. The horizontal axis represents time and time increases from the left side of the plot to the right side of the plot.

The seventh plot from the top of FIG. 12 is a plot of engine knock background noise level for cylinder number six versus time. The vertical axis represents engine knock background noise level for cylinder number six and the engine knock background noise level for cylinder number six increases in the direction of the vertical axis arrow. Trace 1214 represents the engine knock background noise level for cylinder number six. The horizontal axis represents time and time increases from the left side of the plot to the right side of the plot.

The eighth plot from the top of FIG. 12 is a plot of engine knock background noise level for cylinder number seven versus time. The vertical axis represents engine knock background noise level for cylinder number seven and the engine knock background noise level for cylinder number seven increases in the direction of the vertical axis arrow. Trace 1216 represents the engine knock background noise level for cylinder number seven. The horizontal axis represents time and time increases from the left side of the plot to the right side of the plot.

The ninth plot from the top of FIG. 12 is a plot of engine knock background noise level for cylinder number eight versus time. The vertical axis represents engine knock background noise level for cylinder number eight and the engine knock background noise level for cylinder number eight increases in the direction of the vertical axis arrow. Trace 1218 represents the engine knock background noise level for cylinder number eight. The horizontal axis represents time and time increases from the left side of the plot to the right side of the plot.

The tenth plot from the top of FIG. 12 is a plot of VDE degradation indication versus time. The vertical axis represents VDE degradation and VDE degradation is indicated when trace 1212 is near the vertical axis arrow. VDE degradation is not indicated when trace 1212 is near the horizontal axis. Trace 1202 represents the VDE degradation state. The horizontal axis represents time and time increases from the left side of the plot to the right side of the plot.

At time t0, the engine is operating in V8 mode and VDE degradation is not indicated. The engine knock background noise levels for cylinders 1-8 are at middle levels. At time t1, the engine is commanded into V6 mode where only six cylinders of the engine's eight cylinders are combusting fuel. The intake and exhaust valves of the two deactivated cylinders are commanded closed and held closed over one or more engine cycles. Further, the fuel injectors of the two cylinders that are commanded off or deactivated are commanded off. In this example, cylinder numbers 3 and 5 are commanded off. The engine knock background noise level of cylinder number 4 is reduced because fuel injectors for cylinder number 3 are commanded off. However, the engine knock background noise level of cylinder number 7 is not reduced because the fuel injectors of cylinder number 7 continue to operate even though they are commanded off.

At time t2, VDE degradation is indicated in response to the engine knock noise level of cylinder number 7 not being reduced. Shortly thereafter at time t3, the engine is transitioned back to V8 mode in response to the indication of VDE degradation. By reactivating the deactivated engine cylinders, it may be possible to reduce the possibility of further engine degradation and/or engine emission degradation. The engine continues to operate in V8 mode after VDE degradation is indicated.

In this way, the engine knock background noise level may be used to as a basis for indicating the presence or absence of VDE mode degradation. Further, in some examples, VDE mode degradation may be indicated if the engine background noise level for one or more engine cylinders does not increase in response to commanding one or more cylinders activated.

Figure 13:
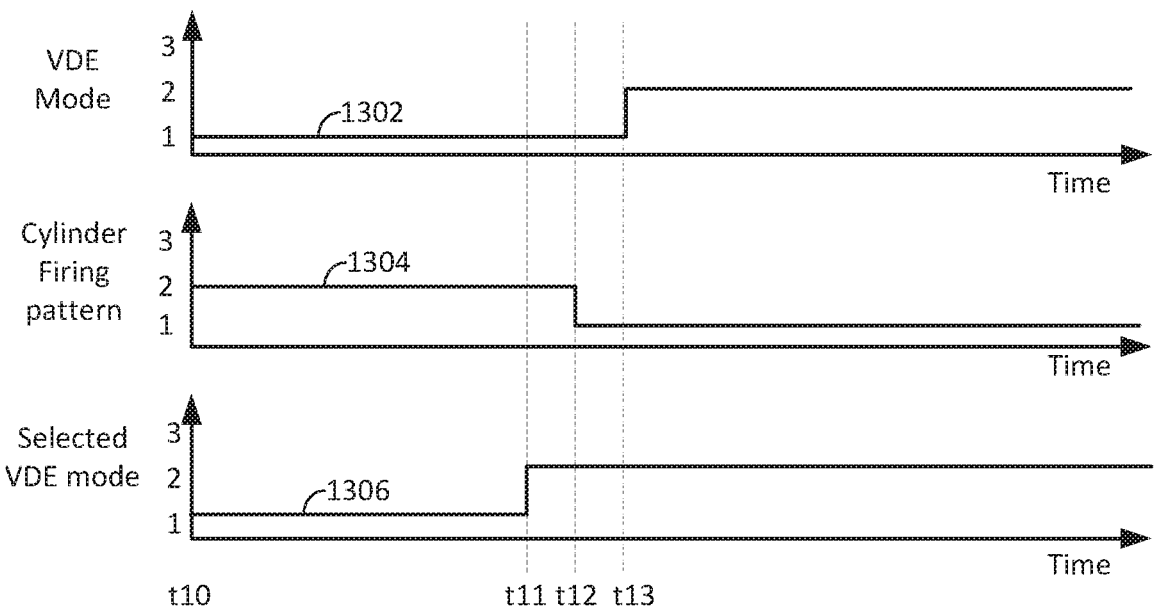

Referring now to FIG. 13, a first example sequence for maintaining engine knock background noise levels for engine cylinders is shown. The sequence of FIG. 13 may be provided via the system of FIG. 1 in cooperation with the method of FIGS. 2 and 7.

The first plot from the top of FIG. 13 is a plot of VDE mode versus time. The vertical axis represents VDE mode and VDE modes are identified by labels along the vertical axis. VDE modes 1-3 are shown only for illustration purposes and additional or fewer available VDE modes may be provided. VDE modes may include but are not limited to V6S, V6R, I4S, and I4R. Trace 1302 represents the VDE mode. The horizontal axis represents time and time increases from the left side of the plot to the right side of the plot.

The second plot from the top of FIG. 13 is a plot of cylinder firing pattern versus time. The vertical axis represents cylinder firing pattern and three cylinder firing patterns for one VDE mode are shown in this example. Trace 1304 represents the cylinder firing pattern. The horizontal axis represents time and time increases from the left side of the plot to the right side of the plot.

The third plot from the top of FIG. 13 is a plot of selected VDE mode versus time. The vertical axis represents selected VDE mode and there are three possible selected VDE modes in this example. Trace 1306 represents the selected VDE mode. The horizontal axis represents time and time increases from the left side of the plot to the right side of the plot.

At time t10, the selected VDE mode is mode 1 and the cylinder firing pattern is pattern number 2. The presently activated VDE mode is mode 1. At time t11, the selected VDE mode is changed to mode 2 in response to vehicle operating conditions. The cylinder firing pattern remains the second firing pattern and VDE mode 1 remains activated. The controller searches through the various cylinder firing patterns for the selected VDE mode and determines that a greatest total of engine knock background noise levels for engine cylinders in the present VDE mode may be maintained (e.g., kept at or near their present levels) by adjusting the cylinder firing pattern of the selected VDE mode. The new cylinder firing pattern is selected at time t12 for the selected VDE mode. The selected VDE mode is activated and it operates the engine cylinders with the new cylinder firing pattern at time t13.

In this way, a cylinder firing pattern may be adjusted to maintain engine knock background noise levels of one or more engine cylinders. The cylinder firing pattern of a VDE mode that is about to be activated may be changed to maintain the engine knock background noise levels of the engine cylinders. By maintaining engine knock background noise levels, it may be possible to avoid false positive knock indications. Further, it may be possible to avoid missing engine knock events so that engine degradation may be avoided.

Figure 14:
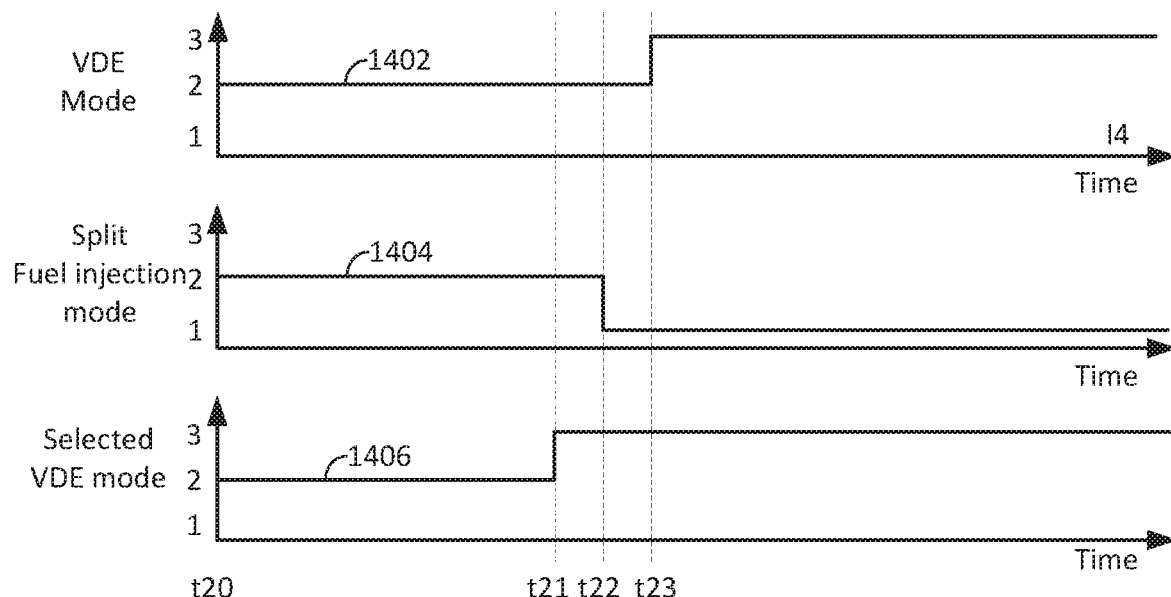

Referring now to FIG. 14, a second example sequence for maintaining engine knock background noise levels for engine cylinders is shown. The sequence of FIG. 14 may be provided via the system of FIG. 1 in cooperation with the method of FIGS. 2 and 7.

The first plot from the top of FIG. 14 is a plot of VDE mode versus time. The vertical axis represents VDE mode and VDE modes are identified by labels along the vertical axis. VDE modes 1-3 are shown only for illustration purposes and additional or fewer available VDE modes may be provided. VDE modes may include but are not limited to V6S, V6R, I4S, and I4R. Trace 1402 represents the VDE mode. The horizontal axis represents time and time increases from the left side of the plot to the right side of the plot.

The second plot from the top of FIG. 14 is a plot of cylinder split injection mode versus time. The vertical axis represents cylinder split injection mode and three cylinder spilt injection modes are shown in this example. Trace 1404 represents the cylinder split injection mode. The horizontal axis represents time and time increases from the left side of the plot to the right side of the plot.

The third plot from the top of FIG. 14 is a plot of selected VDE mode versus time. The vertical axis represents selected VDE mode and there are three possible selected VDE modes in this example. Trace 1406 represents the selected VDE mode. The horizontal axis represents time and time increases from the left side of the plot to the right side of the plot.

At time t20, the selected VDE mode is mode 2 and the cylinder split injection mode is 2. The presently activated VDE mode is mode 2. At time t21, the selected VDE mode is changed to mode 3 in response to vehicle operating conditions. The cylinder split injection mode remains 2 and VDE mode 2 remains activated. The controller searches through the various cylinder split fuel injection modes for the selected VDE mode and determines that a greatest total of engine knock background noise levels for engine cylinders in the present VDE mode may be maintained (e.g., kept at or near their present levels) by adjusting the cylinder split injection mode of the selected VDE mode. The new cylinder split injection mode is selected at time t22 for the selected VDE mode. The selected VDE mode is activated and it operates the engine cylinders with the new cylinder split fuel injection mode at time t23.

In this way, a cylinder split injection mode may be adjusted to maintain engine knock background noise levels of one or more engine cylinders. The cylinder split injection mode of a VDE mode that is about to be activated may be changed to maintain the engine knock background noise levels of the engine cylinders. By maintaining engine knock background noise levels, it may be possible to avoid false positive knock indications. Further, it may be possible to avoid missing engine knock events so that engine degradation may be avoided.

Figure 15:
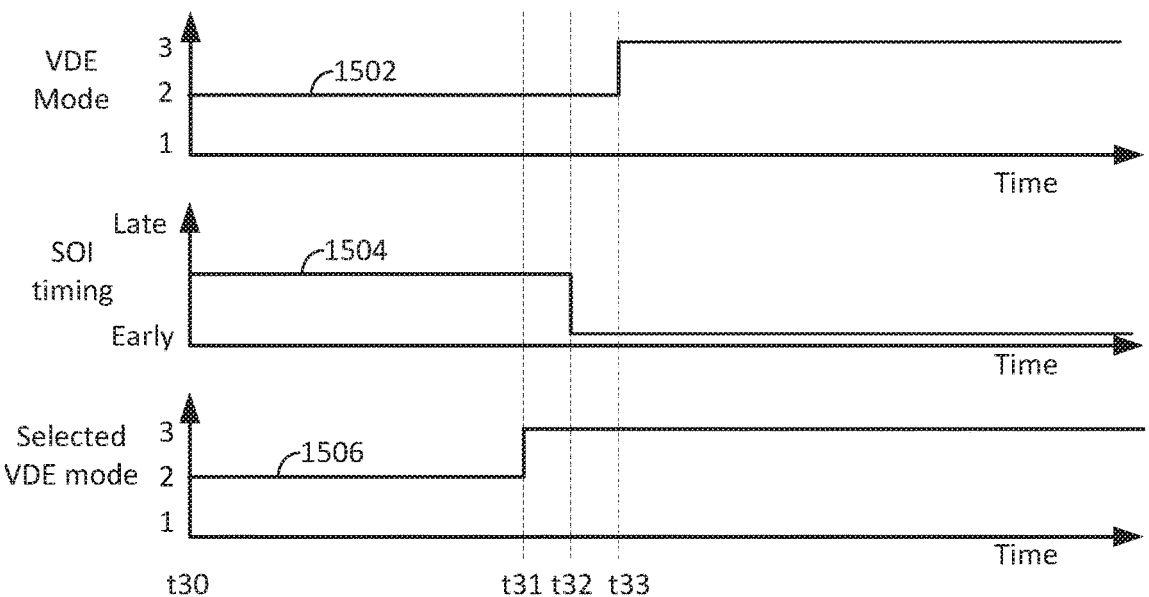

Referring now to FIG. 15, a third example sequence for maintaining engine knock background noise levels for engine cylinders is shown. The sequence of FIG. 15 may be provided via the system of FIG. 1 in cooperation with the method of FIGS. 2 and 7.

The first plot from the top of FIG. 15 is a plot of VDE mode versus time. The vertical axis represents VDE mode and VDE modes are identified by labels along the vertical axis. VDE modes 1-3 are shown only for illustration purposes and additional or fewer available VDE modes may be provided. VDE modes may include but are not limited to V6S, V6R, I4S, and I4R. Trace 1502 represents the VDE mode. The horizontal axis represents time and time increases from the left side of the plot to the right side of the plot.

The second plot from the top of FIG. 15 is a plot of cylinder start of injection time versus time. The vertical axis represents cylinder start of injection time and cylinder start of injection time becomes further retarded in the direction of the vertical axis arrow. Trace 1504 represents the cylinder start of injection time. The horizontal axis represents time and time increases from the left side of the plot to the right side of the plot.

The third plot from the top of FIG. 15 is a plot of selected VDE mode versus time. The vertical axis represents selected VDE mode and there are three possible selected VDE modes in this example. Trace 1506 represents the selected VDE mode. The horizontal axis represents time and time increases from the left side of the plot to the right side of the plot.

At time t30, the selected VDE mode is mode 2 and the cylinder start of injection time is late (e.g., retarded). The presently activated VDE mode is mode 2. At time t31, the selected VDE mode is changed to mode 3 in response to vehicle operating conditions. The cylinder start of injection time remains retarded and VDE mode 2 remains activated. The controller searches through the start of injection times for the selected VDE mode and determines that a greatest total of engine knock background noise levels for engine cylinders in the present VDE mode may be maintained (e.g., kept at or near their present levels) by advancing the start of injection timing of the selected VDE mode. The new cylinder start of injection time is selected at time t32 for the selected VDE mode. The selected VDE mode is activated and it operates the engine cylinders with the new start of injection time at time t33.

In this way, a cylinder start of injection time may be advanced to maintain engine knock background noise levels of one or more engine cylinders. The cylinder start of fuel injection time for the VDE mode that is about to be activated may be changed to maintain the engine knock background noise levels of the engine cylinders. By maintaining engine knock background noise levels, it may be possible to avoid false positive knock indications. Further, it may be possible to avoid missing engine knock events so that engine degradation may be avoided.

Figure 16:
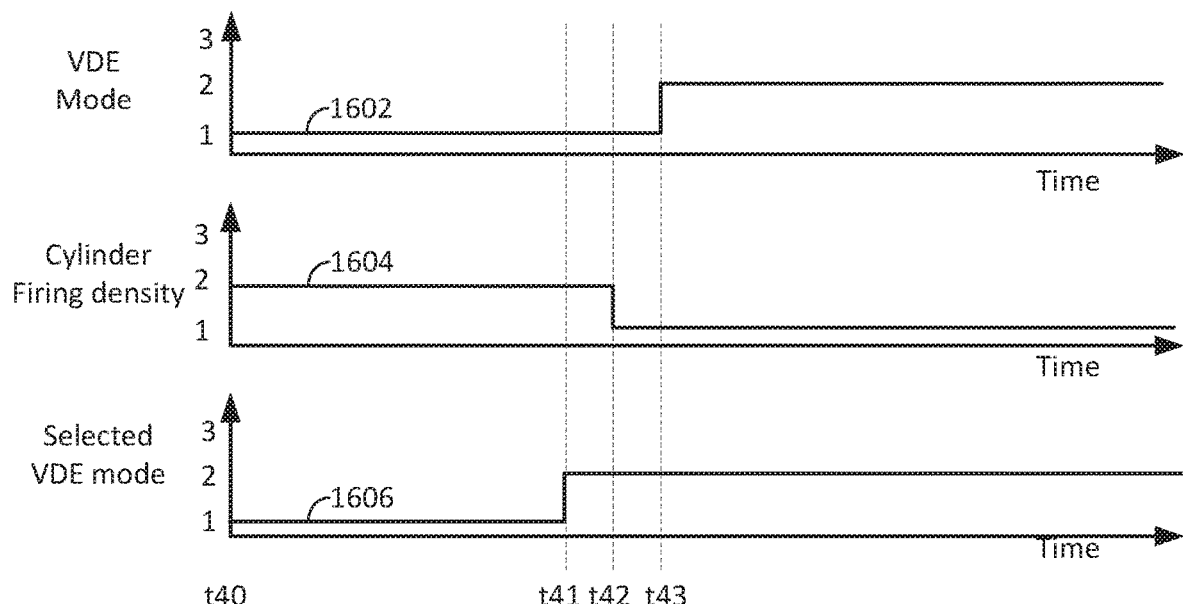

Referring now to FIG. 16, a fourth example sequence for maintaining engine knock background noise levels for engine cylinders is shown. The sequence of FIG. 16 may be provided via the system of FIG. 1 in cooperation with the method of FIGS. 2 and 7.

The first plot from the top of FIG. 16 is a plot of VDE mode versus time. The vertical axis represents VDE mode and VDE modes are identified by labels along the vertical axis. VDE modes 1-3 are shown only for illustration purposes and additional or fewer available VDE modes may be provided. VDE modes may include but are not limited to V6S, V6R, I4S, and I4R. Trace 1602 represents the VDE mode. The horizontal axis represents time and time increases from the left side of the plot to the right side of the plot.

The second plot from the top of FIG. 16 is a plot of cylinder firing density versus time. The vertical axis represents cylinder firing density and cylinder firing density increases in the direction of the vertical axis arrow. Trace 1604 represents the cylinder start of injection time. The horizontal axis represents time and time increases from the left side of the plot to the right side of the plot.

The third plot from the top of FIG. 16 is a plot of selected VDE mode versus time. The vertical axis represents selected VDE mode and there are three possible selected VDE modes in this example. Trace 1606 represents the selected VDE mode. The horizontal axis represents time and time increases from the left side of the plot to the right side of the plot.

At time t40, the selected VDE mode is mode 1 and the cylinder firing density is at a higher level. The presently activated VDE mode is mode 1. At time t41, the selected VDE mode is changed to mode 2 in response to vehicle operating conditions. The cylinder firing density remains at a higher level and VDE mode 1 remains activated. The controller searches through the cylinder densities for the selected VDE mode and determines that a greatest total of engine knock background noise levels for engine cylinders in the present VDE mode may be maintained (e.g., kept at or near their present levels) by decreasing the cylinder firing density from is present level and increasing the cylinder firing density above the cylinder firing density of the selected VDE mode. The new cylinder firing density is selected at time t42 for the selected VDE mode. The selected VDE mode is activated and it operates the engine cylinders with the new cylinder firing density at time t33.

In this way, a cylinder firing density may be changed from the cylinder firing density of a selected VDE mode to maintain engine knock background noise levels of one or more engine cylinders. The cylinder firing density for the VDE mode that is about to be activated may be changed to maintain the engine knock background noise levels of the engine cylinders. By maintaining engine knock background noise levels, it may be possible to avoid false positive knock indications. Further, it may be possible to avoid missing engine knock events so that engine degradation may be avoided.

Thus, the methods described herein provide for a method for operating an engine, comprising: operating a variable displacement engine; changing a start of injection (SOI) time from a first SOI time to a second SOI time via a controller based on maintaining fuel injector control actions for one or more engine cylinders that are performed during cylinder knock detection windows for engine cylinders when the variable displacement engine is operated with less than all of its cylinders activated. In other words, the SOI may be changed when a selected VDE mode may change engine knock background noise levels so that the amount of change in engine background noise levels of the engine's cylinders that is due to a VDE mode change may be reduced. The method includes where the second SOI time is advanced from the first SOI time toward EVC of the cylinder receiving the fuel via a pulse width having the second SOI time. The method includes where the SOI time is for a direct fuel injector. The method includes where changing the SOI time is responsive to a VDE mode change. The method includes where the VDE mode change includes changing from a first cylinder firing density to a second cylinder firing density. The method includes where first cylinder firing density is greater than the second cylinder firing density. The method includes where the second SOI time is later than exhaust valve closing timing for an engine cylinder receiving fuel from a fuel injection that begins at the second SOI time.

The methods described herein also provide for a method for operating an engine, comprising: operating a variable displacement engine; changing an engine cylinder firing pattern from a first cylinder firing pattern to a second cylinder firing pattern via a controller based on maintaining fuel injector control actions for one or more engine cylinders that are performed during cylinder knock detection windows for engine cylinders when the variable displacement engine is operated with less than all of its cylinders activated. The method further comprises maintaining a cylinder firing density when changing from the first cylinder firing pattern to the second cylinder firing pattern. The method includes where the fuel injector control actions are maintained to maintain engine knock background noise levels of one or more engine cylinders. The method further comprises adjusting start of fuel injection timing to maintain the fuel injector control actions. The method further comprises integrating the output of the engine knock sensor to determine the engine knock background noise levels. The method includes where maintaining fuel injector control actions includes maintaining fuel injector control actions of a presently activated variable displacement mode. The method includes where the fuel injector control actions include opening or closing fuel injectors. The method includes where the fuel injector are direct fuel injectors.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine operating method, comprising:
operating a variable displacement engine;
operating the variable displacement engine with less than all of its cylinders activated, assessing a change in background engine noise, and changing a start of injection (SOI) time from a first SOI time to a second SOI time via a controller to maintain fuel injector openings and closings for one or more engine cylinders, that are performed during engine crankshaft angular intervals where a presence or absence of engine knock is assessed, in response to the change in background engine noise.

2. The method of claim 1, where the second SOI time is advanced from the first SOI time.

3. The method of claim 1, where the SOI time is for a direct fuel injector.

4. The method of claim 1, where changing the SOI time is responsive to a VDE mode change.

5. The method of claim 4, where the VDE mode change includes changing from a first cylinder firing density to a second cylinder firing density.

6. The method of claim 5, where the first cylinder firing density is greater than the second cylinder firing density.

7. The method of claim 1, where the second SOI time is later than exhaust valve closing timing for an engine cylinder receiving fuel from a fuel injection that begins at the second SOI time.

8. An engine operating method, comprising:
operating a variable displacement engine;
operating the variable displacement engine with less than all of its cylinders activated, assessing a change in background engine noise, and changing an engine cylinder firing pattern from a first cylinder firing pattern to a second cylinder firing pattern via a controller to maintain fuel injector openings and closings for one or more engine cylinders, that are performed during engine crankshaft angular intervals where a presence or absence of engine knock is assessed, in response to the change in background engine noise.

9. The method of claim 8, further comprising maintaining a cylinder firing density when changing from the first cylinder firing pattern to the second cylinder firing pattern.

10. The method of claim 8, where the fuel injector openings and closings are maintained to maintain engine knock background noise levels of the one or more engine cylinders.

11. The method of claim 10, further comprising adjusting start of fuel injection timing to maintain the fuel injector openings and closings.

12. The method of claim 10, further comprising integrating an output of an engine knock sensor to determine the engine knock background noise levels.

13. The method of claim 8, where the fuel injectors are direct fuel injectors.

14. A system for operating an engine, comprising:
a variable displacement engine; and
a controller including executable instructions stored in non-transitory memory configured to operate the variable displacement engine, change a split ratio fuel injection, assess a change in background noise, and change from operating the variable displacement engine with a first cylinder firing density to operating the variable displacement engine with a second cylinder firing density, that changes a total number of fuel injections that occur in a cylinder knock window, in response to the change in background noise.

15. The system of claim 14, where changing the split ratio fuel injection includes increasing a total number of fuel injections during a cycle of a cylinder.

16. The system of claim 14, where changing the split ratio fuel injection includes decreasing a total number of fuel injections during a cycle of a cylinder.

17. The system of claim 14, further comprising additional instructions configured to change start of injection timing when changing from the first cylinder firing density to the second cylinder firing density.

18. The system of claim 14, further comprising additional instructions configured to change a cylinder firing pattern when changing from the first cylinder firing density to the second cylinder firing density.

* * * * *